(12) United States Patent
Runge et al.

(10) Patent No.: US 12,530,611 B2
(45) Date of Patent: Jan. 20, 2026

(54) SYSTEMS AND METHODS FOR CLASSICAL ENTANGLEMENT IN LARGE MULTI-QUBIT ACOUSTIC ANALOGUE SYSTEMS

(71) Applicant: Arizona Board of Regents on Behalf of the University of Arizona, Tucson, AZ (US)

(72) Inventors: Keith Runge, Tucson, AZ (US); M. Arif Hasan, Tucson, AZ (US); Pierre A. Deymier, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 18/841,669

(22) PCT Filed: Mar. 1, 2023

(86) PCT No.: PCT/US2023/063499
§ 371 (c)(1),
(2) Date: Aug. 26, 2024

(87) PCT Pub. No.: WO2024/172846
PCT Pub. Date: Aug. 22, 2024

(65) Prior Publication Data
US 2025/0173593 A1 May 29, 2025

Related U.S. Application Data

(60) Provisional application No. 63/315,423, filed on Mar. 1, 2022.

(51) Int. Cl.
*G06N 10/40* (2022.01)
*G06N 10/00* (2022.01)
(Continued)

(52) U.S. Cl.
CPC .............. *G06N 10/40* (2022.01); *G06N 10/00* (2019.01); *G06N 10/20* (2022.01); *G10K 11/22* (2013.01); *G10K 15/00* (2013.01); *H03K 19/195* (2013.01)

(58) Field of Classification Search
CPC ........ G06N 10/40; G06N 10/20; G06N 10/00; G10K 15/00; G10K 11/22; H03K 19/195
(Continued)

(56) References Cited

U.S. PATENT DOCUMENTS

2017/0259513 A1 9/2017 Xia et al.
2018/0292523 A1 10/2018 Orenstein et al.
2018/0372949 A1 12/2018 Abramov

FOREIGN PATENT DOCUMENTS

WO  WO-2015178990 A2 * 11/2015 ......... G06F 13/4068

OTHER PUBLICATIONS

Patent Cooperation Treaty, International Search Report and Written Opinion, International Application No. PCT/US23/63499, date of mailing Aug. 21, 2024, 12 pages.
(Continued)

*Primary Examiner* — Arnold M Kinkead
(74) *Attorney, Agent, or Firm* — Polsinelli PC

(57) ABSTRACT

Disclosed are systems and methods for scalable, large, multiple logical phi-bit quantum analogue system for achieving controllable classical entanglement (e.g., non-separability). A method can include driving an array of elastically coupled acoustic waveguides by exciting at least a first acoustic waveguide of the array using a first frequency and a second acoustic waveguide of the array using a second frequency, wherein the first frequency is different from the second frequency. A plurality of acoustic fields propagating through the array of elastically coupled acoustic waveguides can be determined, each respective acoustic field generated
(Continued)

based on the driving of the array using the first and second frequencies. A plurality of logical phi-bits can be determined based on spectrally partitioning the one or more acoustic fields, wherein each logical phi-bit of the plurality of logical phi-bits is associated with at least two independently measurable phases.

15 Claims, 12 Drawing Sheets

(51) Int. Cl.
*G06N 10/20* (2022.01)
*G10K 11/22* (2006.01)
*G10K 15/00* (2006.01)
*H03K 19/195* (2006.01)

(58) Field of Classification Search
USPC .................. 257/9, 14; 326/1, 4, 7; 977/762; 385/11; 331/107 A, 107 S; 327/366
See application file for complete search history.

(56) References Cited

OTHER PUBLICATIONS

Hasan, A. H. et al. "Experimental classical entanglement in a 16 acoustic qubit-analogue," Scientific Reports, vol. 11, Dec. 20, 2021, 15 pages.

* cited by examiner

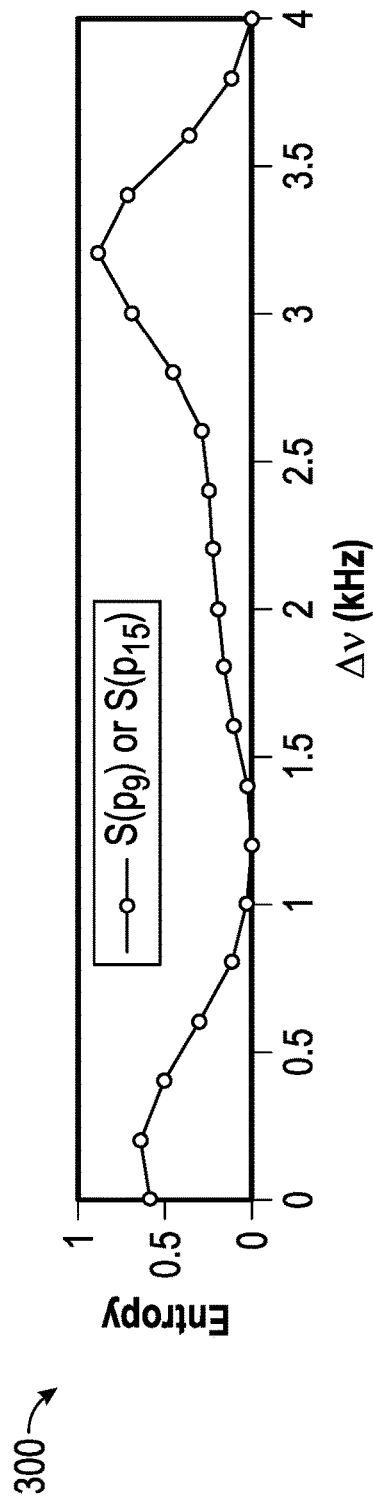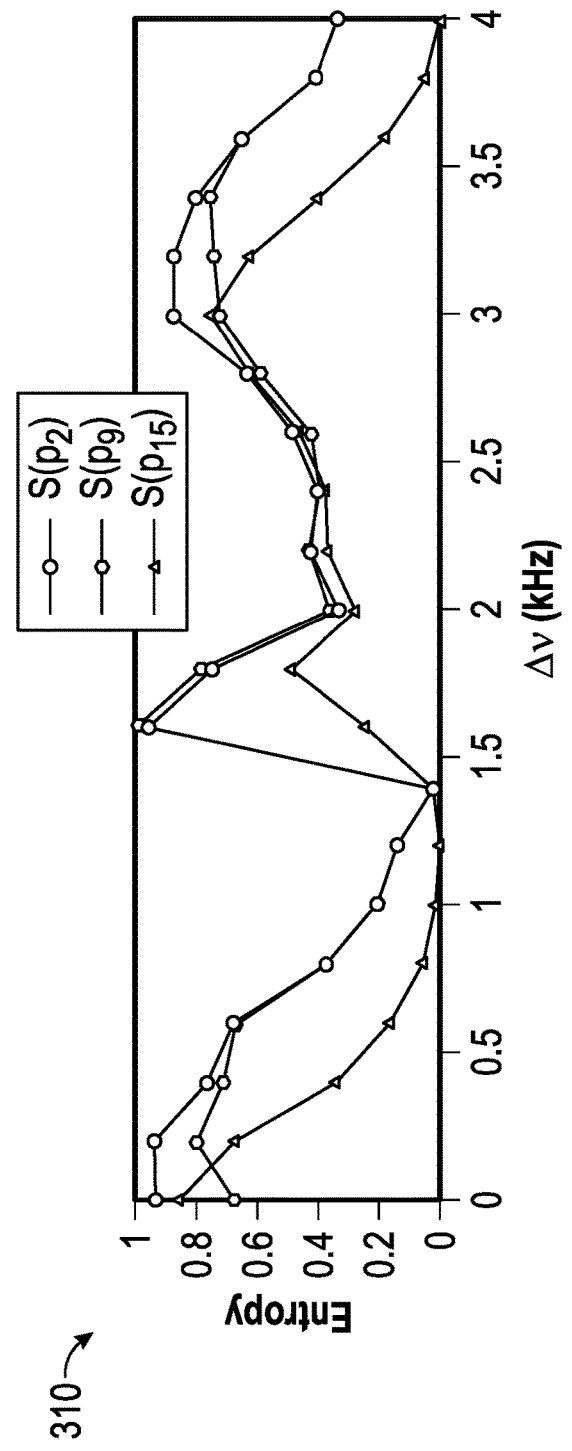
FIG. 3A
FIG. 3B

SYSTEMS AND METHODS FOR CLASSICAL ENTANGLEMENT IN LARGE MULTI-QUBIT ACOUSTIC ANALOGUE SYSTEMS

CROSS-REFERENCE TO RELATED APPLICATIONS

This application claims the benefit of U.S. Provisional Application No. 63/315,423, filed Mar. 1, 2022, which is hereby incorporated by reference, in its entirety and for all purposes.

GOVERNMENT SUPPORT

This invention was made with government support under Grant No. 1640860 awarded by the National Science Foundation. The government has certain rights in the invention.

FIELD

The present disclosure generally relates to quantum-analogue computing, and in particular relates to providing a scalable, large, multiple logical phi-bit quantum analogue system for achieving controllable classical entanglement (e.g., nonseparability).

BACKGROUND

Classical waves (e.g., electromagnetic or acoustic waves) can possess attributes reminiscent of quantum entanglement. Classical entanglement is associated with the occurrence or presence of one or more mathematical and/or physical features of quantum entanglement in the representation of classical waves. More particularly, the emergence of a multipartite tensor product structure in the state-space representation of a classical wave can lead to the notion of inseparability between different degrees of freedom as an aspect of classical entanglement.

Considering two two-level degrees of freedom of the same classical wave, the wave's four-dimensional product Hilbert space can contain superpositions of product states of the wave that are not algebraically separable into a single product. For example, this is the case for spin angular momentum, orbital angular momentum (OAM), polarization, direction of propagation and/or radial degree of freedom in optical beams, as well as for direction of propagation, normal modes analogous to OAM, and/or pseudospin in acoustic or elastic waveguides.

In linear classical systems, the dimension of the product Hilbert space may, however, be limited by the number of available degrees of freedom. By contrast, nonlinear classical systems may support nonlinear waves that span Hilbert spaces with exponentially scaling dimension. These classical forms of entanglement (e.g., between degrees of freedom of a single system) differ from entanglement between degrees of freedom of different sub-systems. Nonetheless, these sub-systems may be subject to representation since the partitioning of a physical system into sub-systems is not unique and conditioned by measurement. Classical entanglement may also be distinguished from quantum entanglement in that it does not exhibit quantum nonlocality. However, partitioning of classical waves outside the spatial domain can co-locate the subsystems in the same physical space, obviating the issue of distance-dependent interactions. Additionally, classically entangled superpositions of states involve directly measurable complex coefficients that are amplitudes (e.g., with phases), in contrast to quantum superpositions in which complex coefficients are given as probability amplitudes obeying the Born rule. Consequently, classically entanglement superpositions of states are not susceptible to decoherence.

It is with these observations in mind, among others, that various aspects of the present disclosure were conceived and developed.

BRIEF DESCRIPTION OF THE DRAWINGS

FIG. 3A is a graph depicting the calculated entropy of partially traced states for different values of a frequency tuning parameter $\Delta v$ in an example N=2 logical phi-bit composite subsystem;

FIG. 3B is a graph depicting the calculated entropy of partially traced states for different values of a frequency tuning parameter $\Delta v$ in an example N=3 logical phi-bit composite subsystem;

Corresponding reference characters indicate corresponding elements among the view of the drawings. The headings used in the figures do not limit the scope of the claims.

DETAILED DESCRIPTION

Figure 1A:
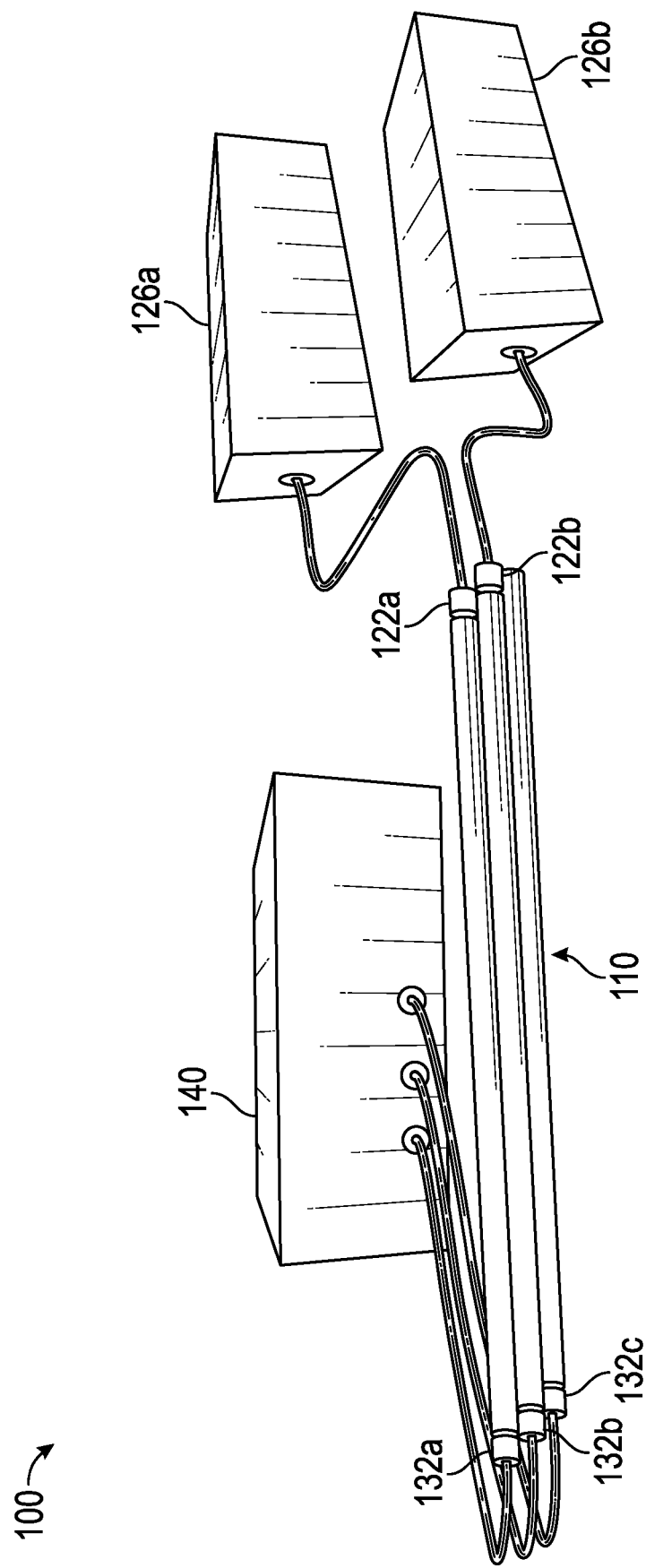
FIG. 1A is a schematic illustration of an example experimental nonlinear acoustic waveguide-transducer-amplifier-generator platform.

The present disclosure relates to systems and techniques for providing experimentally controllable classical entanglement (e.g., nonseparability) in a large, scalable multiple phi-bit system. A phi-bit is a two-level classical analogue of the quantum bit (e.g., qubit) and lies in the spectral domain of nonlinearly coupled acoustic waveguides. In some examples, classical acoustic systems such as those described herein can support highly complex states that are analogous to entangled quantum states which span a Hilbert space that scales exponentially with the number of phi-bits.

According to aspects of the present disclosure, the ability to navigate a substantial portion of the exponential Hilbert space is experimentally demonstrated. Notably, expanding access to a wide expanse of elastic product states' Hilbert space, with controllable degrees of nonseparability, can be seen as an essential prerequisite for the development of acoustic-based quantum analogue devices and quantum analogue information processing platforms. Coupled acoustic waveguides may avoid many of the expensive requirements of traditional or existing quantum systems, which include low temperature operation, short computation time, and scalability. Classical entanglement is also vital for the implementation of quantum computing style algorithms that exploit exponential complexity.

To achieve this goal, it is important to understand and solve different challenges.

The possibility of achieving and controlling scalable classically entangled (e.g., inseparable) multipartite states may fundamentally challenge the advantages of quantum systems in harnessing the power of complexity in information science. According to aspects of the present disclosure, the extent of classical entanglement in an example 16 acoustic qubit-analogue platform is experimentally investigated. In some embodiments, the acoustic qubit-analogue (e.g., also referred to as a logical phi-bit) can result from the spectral partitioning of the nonlinear acoustic field of externally driven coupled waveguides. Each logical phi-bit is a two-level subsystem characterized by two independently measurable phases. The phi-bits are co-located within the same physical space, enabling distance-independent interactions. In some embodiments, the example 16-phi-bit system described herein can be given by a vector state representation which lives in a $2^{16}$-dimensional Hilbert space. The calculation of the entropy of entanglement can be seen to demonstrate the possibility of achieving inseparability of the vector state and of navigating the corresponding Hilbert space. The systems and techniques described herein suggest a new direction in harnessing the complexity of classical inseparability in information science.

Large multi-qubit (e.g., in the range of 10 to 25 qubits) entangled states have been demonstrated in experimental systems supporting superconducting or photonic qubits, as well as trapped ions. Notwithstanding distinguishing features between quantum and classical entanglement, the possibility of preparing and controlling exponentially complex nonseparable, nonlinear superpositions of acoustic waves may offer an alternative to genuine quantum systems to experimentally realize the advantage of complexity and parallelism of entanglement.

As mentioned previously, experimentally investigated and described herein is the extent of classical entanglement in the example of a 16 acoustic qubit-analogue platform. The acoustic qubit-analogues (subsequently referred to as "phase-bits" and/or "phi-bits") result from the spectral partitioning of the nonlinear acoustic field in an externally driven array of coupled acoustic waveguides. Each phi-bit is a two-level subsystem characterized by two independent measurable phases owing to the degree of freedom across the array of waveguides.

A representation of the large multi-phi-bit system is constructed to demonstrate the possibility of achieving inseparability of the vector state of the multipartite system in a $2^{16}$-dimensional Hilbert space. To illustrate classical entanglement and the ability of the present disclosure to easily navigate a substantial portion of the large Hilbert space, the entropy of entanglement of various partitioning of the multipartite phi-bit system is utilized.

Example Physical Platform to Realize Acoustic Qubit-Analogues

In some embodiments, acoustic qubit-analogues (e.g., phi-bits) can be physically realized using an example experimental setup such as that depicted in FIG. 1A. In particular, FIG. 1A is a schematic illustration of an example experimental nonlinear acoustic waveguide-transducer-amplifier-generator platform 100.

As illustrated in FIG. 1A, the physical platform 100 associated with the example experimental setup can include a plurality of one-dimensional coupled acoustic waveguides 110, shown here as comprising three rods arranged in a linear array. In some embodiments, a greater quantity of rods and/or other coupled waveguides can be utilized in providing the presently disclosed array of elastically coupled acoustic waveguides. In some embodiments, the rods (e.g., waveguides) 110 can be aluminum rods having a circular cross-section. The rods (e.g., waveguides) 110 can be arranged in a linear array with lateral gaps filled with an epoxy (not shown in FIG. 1A, shown in the example of FIG. 6).

One or more transducers can be provided to drive and detect the acoustic field at the respective ends of the rods 110. For example, one or more detecting transducers 132a, 132b, 132c, can be provided at one distal end of the rods 110 (shown in FIG. 1A as the left-most end of the rods 110). One or more driving transducers 122a, 122b, can be provided at the opposite distal end of the rods 110 (shown in FIG. 1A as the right-most end). The quantity of driving transducers 122 can be less than or equal to the quantity of acoustic waveguides included in the array 110. The quantity of detecting transducers 132 (also referred to as recording or receiving transducers) may be equal to the quantity of acoustic waveguides included in the array 110 (e.g., a one-to-one correspondence). In some embodiments, one or more function generators and/or amplifiers can be used excite two driving transducers. For instance, a first signal generator/amplifier 126a can be used to excite the first driving transducer 122a and a second signal generator/amplifier 126b can be used to excite the second driving transducer 122b. As illustrated, the first driving transducer 122a can be located or otherwise coupled to a waveguide at the edge of the array 110 and the second driving transducer 122b can be located or otherwise coupled to a waveguide in the middle of the array 110.

The first and second driving waveguides can be excited (e.g., driven by the driving transducers 122a, 122b) with sinusoidal signals with frequencies $f_1$ and $f_2$, respectively. In some embodiments, a detecting transducer 132a, 132b, 132c can be located or otherwise coupled to each rod (e.g., waveguide) at the opposite distal end from the driving transducers. The detecting transducers 132a-c can be connected to an oscilloscope or other data acquisition system 140 which collects the data output by the detecting transducers 132a-c. One illustrative example is described in Appendix A.

In some embodiments, the waveguide(s), transducer(s), signal generator(s), amplifier(s), and acquisition system assembly described herein can be seen to behave nonlinearly. The origin of the nonlinearity may be mechanical or electrical, although it is noted that the following description can be applied equally or otherwise independent of the origin of the nonlinear behavior. The nonlinearity can enable multiple approaches for mixing the drivers' frequencies. One illustrative example is described in Appendix B.

The measured displacement field at the detection end of the waveguides can be determined as the Fourier sum of a large number of linear and nonlinear modes, each with its own characteristic frequency. For example, the characteristic frequencies of the nonlinear modes can result from the mixing of the drivers' frequencies.

For each nonlinear mode j, the amplitude of each waveguide can be measured as $C_i^{(j)}$; i=1, 2, 3. Additionally, in some embodiments the phase of waveguides 2 and 3 can be measured, relative to that of waveguide 1, as ($\varphi_{12}^{(j)}$ and $\varphi_{13}^{(j)}$), respectively. In some embodiments, the phases ($\varphi_{12}^{(j)}$) and $\varphi_{13}^{(j)}$) may be associated with the degree of freedom across the array of waveguides (e.g., the array of waveguides 110 depicted in FIG. 1A), because the partitioning of the Hilbert space of a physical system into subsystems is dictated by the experimental interactions and observables. The elastic field can therefore be interpreted as the superposition of a system of interacting oscillator subsystems with frequencies corresponding to those of the nonlinear modes. Accordingly, each oscillator system (or sub-system) can then be identified as a logical phi-bit.

In some embodiments, logical phi-bits are selected in the spectral domain. In selecting logical phi-bits, the effects of noise can be eliminated or otherwise minimized by applying a threshold value. For example, the threshold value can be applied as 0.1% of the maximum amplitude of the output rods (e.g., waveguides), as illustrated in the graph 150 of FIG. 1B.

Figure 1B:
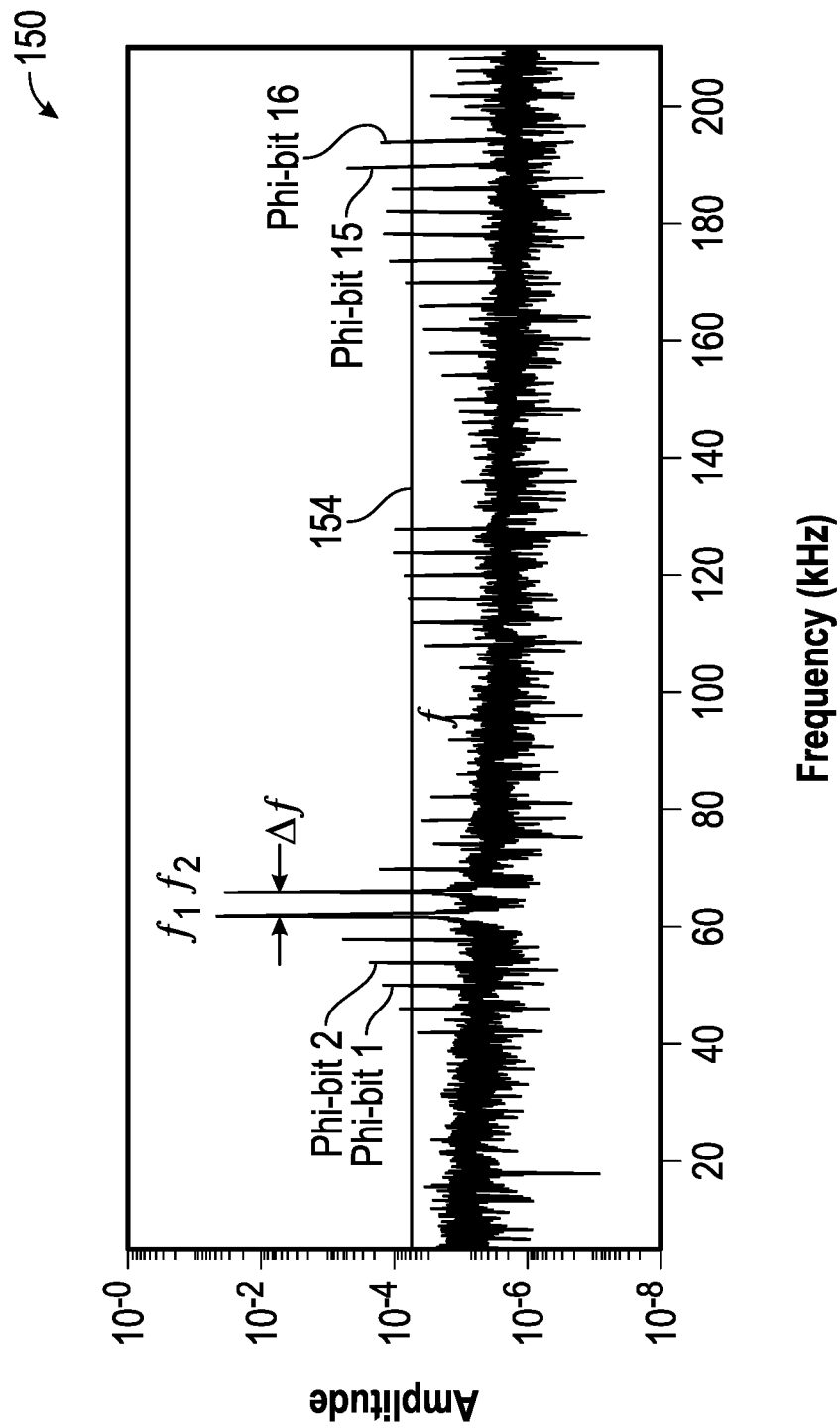
FIG. 1B is a graph depicting a temporal Fourier transform of rod (e.g., waveguide) amplitude, revealing the selection of logical phi-bits 1-16.

In particular, FIG. 1B is a graph 150 depicting a temporal Fourier transform of rod (e.g., waveguide) amplitude, revealing the selection of logical phi-bits 1-16. In some embodiments, the logical phi-bits can be selected in the order of increasing frequency. For example, FIG. 1B depicts the logical phi-bits 1-16 labeled in order of increasing frequency. The horizontal line (e.g., intersecting the vertical amplitude axis near $10^{-4}$) indicates an amplitude threshold 154 for the selection of the logical phi-bits at the aforementioned example threshold value of 0.1% of the maximum amplitude of the output rods. The system parameters associated with the example graph 150 of FIG. 1B can be given as: $f_1$=62 kHz, $f_2$=66 kHz, $\Delta f=|f_2-f_1|$.

Figure 1C:
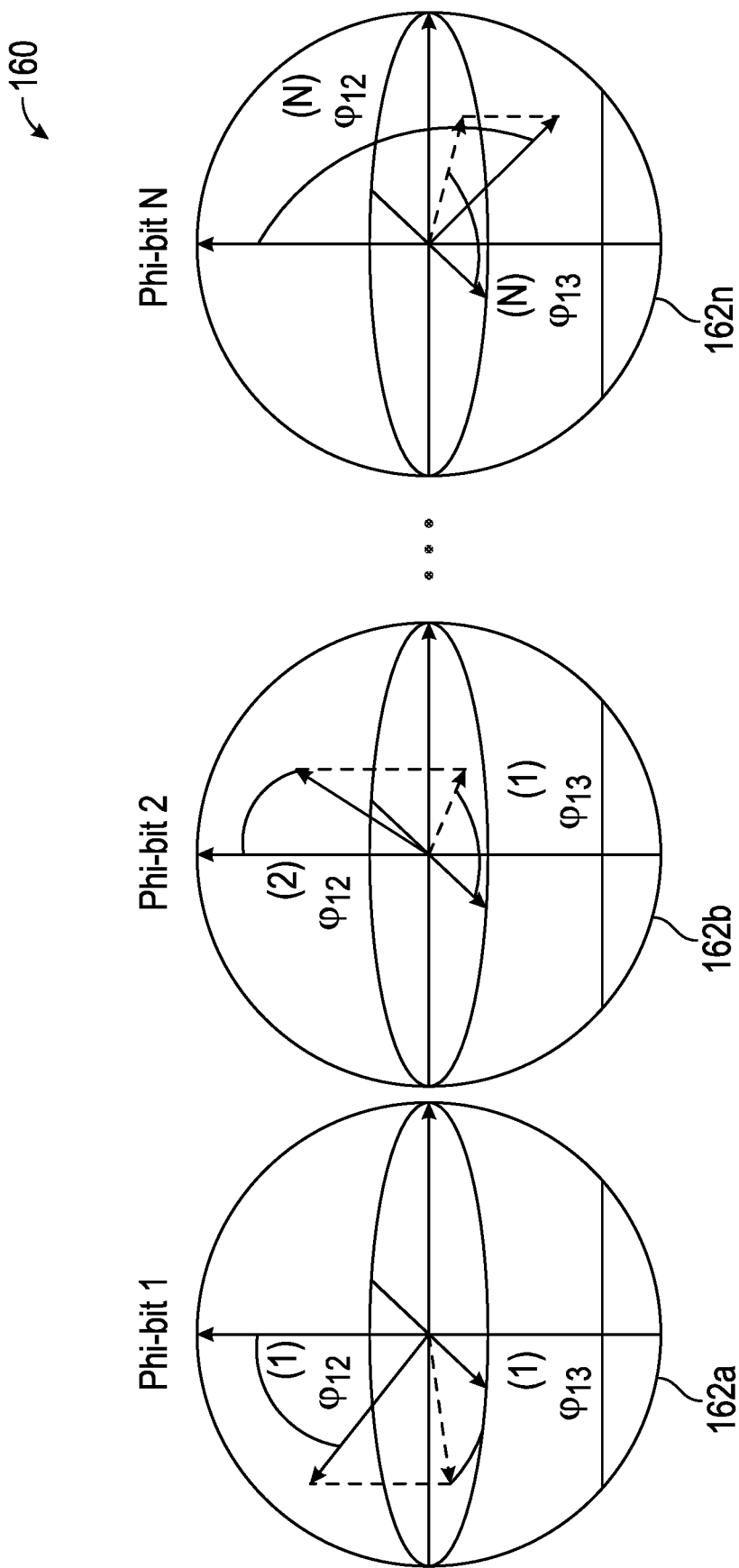
FIG. 1C is a schematic illustration of a two-level phi-bit multipartite system comprising N phi-bits.

In some embodiments, each logical phi-bit can be understood as effectively comprising a two-level subsystem characterized by the two independently measurable phase differences between the waveguides, $\varphi_{12}^{(j)}$ and $\varphi_{13}^{(j)}$. The system composed of three driven and nonlinearly coupled waveguides (e.g., such as the system 100 illustrated in the example of FIG. 1A) can therefore be represented in the spectral domain by a composite system of N two-level subsystems, where N is the number of selected nonlinear modes with different mixed frequencies. For instance, FIG. 1C is a schematic illustration of a two-level phi-bit multipartite system 160 comprising phi-bits 1 through N (e.g., illustrates as the phi-bits 162a, 162b, . . . , 162n).

In some examples, the states of the sub-systems can be correlated through the nonlinear interactions of the waveguide-transducer-amplifier-generator assembly, such as the example system 100 depicted in FIG. 1A. These correlated states can be tunable via one or more of the components of the driving forces as well as their relative amplitude. In some embodiments, another mechanism of tuning the phi-bit states can be provided via the driving frequencies $f_1$ and $f_2$. For instance, as will be described in greater depth below, the driving frequencies can be varied in the form $f_1-\Delta v$ and $f_2+\Delta v$, where $\Delta v$ is a detuning parameter.

Since each phi-bit j is a sub-system with state identifiers, $\varphi_{12}^{(j)}$ and $\varphi_{13}^{(j)}$, a representation of an N phi-bit system can be constructed that is characterized by a state vector $\psi$ that lies in a $2^N$-dimensional Hilbert space. Details of an example construction of the representation of the N phi-bit system are described in Appendix C.

The state vector components for the N phi-bit system can be given as $$1 + e^{i\Sigma_{j=1}^{N} \varphi_{1q_j}^{(j)}},$$

where $q_j$ can take on the values 2 or 3. In some embodiments, this multipartite tensor product structure can be conditioned by the measurability of the phases of each phi-bit. It is noted that the representation of the state vector components given above is provided for purposes of example, and one or more different representations of the nonlinear elastic states of the coupled waveguide system described herein can also be utilized without departing from the scope of the present disclosure. For instance, because the notion of classical entanglement (e.g., nonseparability) may be relative to a choice of representation, aspects of the present disclosure are provided based on a chosen representation which leads to multipartite states that are likely to be nonseparable. In some embodiments, this representation can subsequently be used for nonseparability-based information processing.

The complex coefficients of the $2^N$ states of N phi-bits can be given as:

$$\psi_{00\ldots 0} = \left[1 + e^{i\left(\varphi_{12}^{(1)} + \varphi_{12}^{(2)} + \ldots + \varphi_{12}^{(N)}\right)}\right]/\psi_{Norm}$$
$$\psi_{00\ldots 1} = \left[1 + e^{i\left(\varphi_{12}^{(1)} + \varphi_{12}^{(2)} + \ldots + \varphi_{13}^{(N)}\right)}\right]/\psi_{Norm}$$
$$\vdots$$
$$\psi_{11\ldots 1} = \left[1 + e^{i\left(\varphi_{13}^{(1)} + \varphi_{13}^{(2)} + \ldots + \varphi_{13}^{(N)}\right)}\right]/\psi_{Norm}$$

where $\psi_{Norm} =$ $$\sqrt{\left[1 + e^{i\left(\varphi_{12}^{(1)} + \varphi_{12}^{(2)} + \ldots + \varphi_{12}^{(N)}\right)}\right]^2 + \ldots + \left[1 + e^{i\left(\varphi_{13}^{(1)} + \varphi_{13}^{(2)} + \ldots + \varphi_{13}^{(N)}\right)}\right]^2}.$$

As contemplated herein, the normalized components of $\psi$ form the complex coefficients of a linear combination of $2^N$-dimensional tensor product basis vectors. In some examples, these basis vectors can be denoted by: $|00\ldots 0\rangle, |00\ldots 1\rangle, \ldots, |11\ldots 1\rangle$.

For each phi-bit j, the phase differences $\varphi_{12}^{(j)}$ and $\varphi_{13}^{(j)}$ can be expressed in terms of good "quantum" numbers, namely: the three n labeling the Eigen vectors $\vec{E}_n$ representing the modes of vibration across the waveguides; and the associated discrete sets of wave numbers $k_n$ representing the vibrations along the waveguides through plane waves (e.g., as described in Appendix B).

Any representation of the elastic state of the system, $\psi$, that is a function of the $\varphi_{12}^{(j)}$ and $\varphi_{13}^{(j)}$ is therefore expressible in terms of these "quantum" numbers. For a given representation, such as the one introduced above, there will exist a tensor product structure and tensor product basis in which it can be expanded which is also expressible in terms of $\vec{E}_n$ and $k_n$ (e.g., as described in Appendix C).

Classical Entanglement in Phi-Bits

The displacement field of the nonlinearly coupled waveguides platform described herein is a superposition of states in the 2-dimensional Hilbert subspace (e.g., as described in Appendix C). The separability and nonseparability of these superpositions of states rely upon the tensor product structure of the Hilbert space associated to the states of the system. This concept is described below, beginning with the case of N=2 logical phi-bits, and expanding to the cases of N=3, 4, and finally all 16 logical phi-bits. The extracted frequency values of the logical phi-bits are listed in Table 1, presented below in the context of the discussion of the N=16 logical phi-bits case.

N=2 Logical Phi-Bits

This bipartite system consists of only two logical phi-bits. For example, as described below reference is made to an example using logical phi-bits 9 and 15. In this simple case, the condition for separability of the state can be analytically written in the form:

$$\psi_{01}\psi_{10} = \psi_{00}\psi_{11}, \text{ where } \psi_{00} = \left[1 + e^{i\left(\varphi_{12}^{(9)} + \varphi_{12}^{(15)}\right)}\right]/\psi_{Norm},$$

$$\psi_{01} = \left[1 + e^{i\left(\varphi_{12}^{(9)} + \varphi_{13}^{(15)}\right)}\right]/\psi_{Norm},$$

$$\psi_{10} = \left[1 + e^{i\left(\varphi_{13}^{(9)} + \varphi_{12}^{(15)}\right)}\right]/\psi_{Norm}, \psi_{11} = \left[1 + e^{i\left(\varphi_{13}^{(9)} + \varphi_{13}^{(15)}\right)}\right]/\psi_{Norm},$$

$$\text{and } \psi_{Norm} = \sqrt{\left[1 + e^{i\left(\varphi_{12}^{(9)} + \varphi_{12}^{(15)}\right)}\right]^2 + \left[1 + e^{i\left(\varphi_{12}^{(9)} + \varphi_{13}^{(15)}\right)}\right]^2 + \left[1 + e^{i\left(\varphi_{13}^{(9)} + \varphi_{12}^{(15)}\right)}\right]^2 + \left[1 + e^{i\left(\varphi_{13}^{(9)} + \varphi_{13}^{(15)}\right)}\right]^2}.$$

Figure 2A:
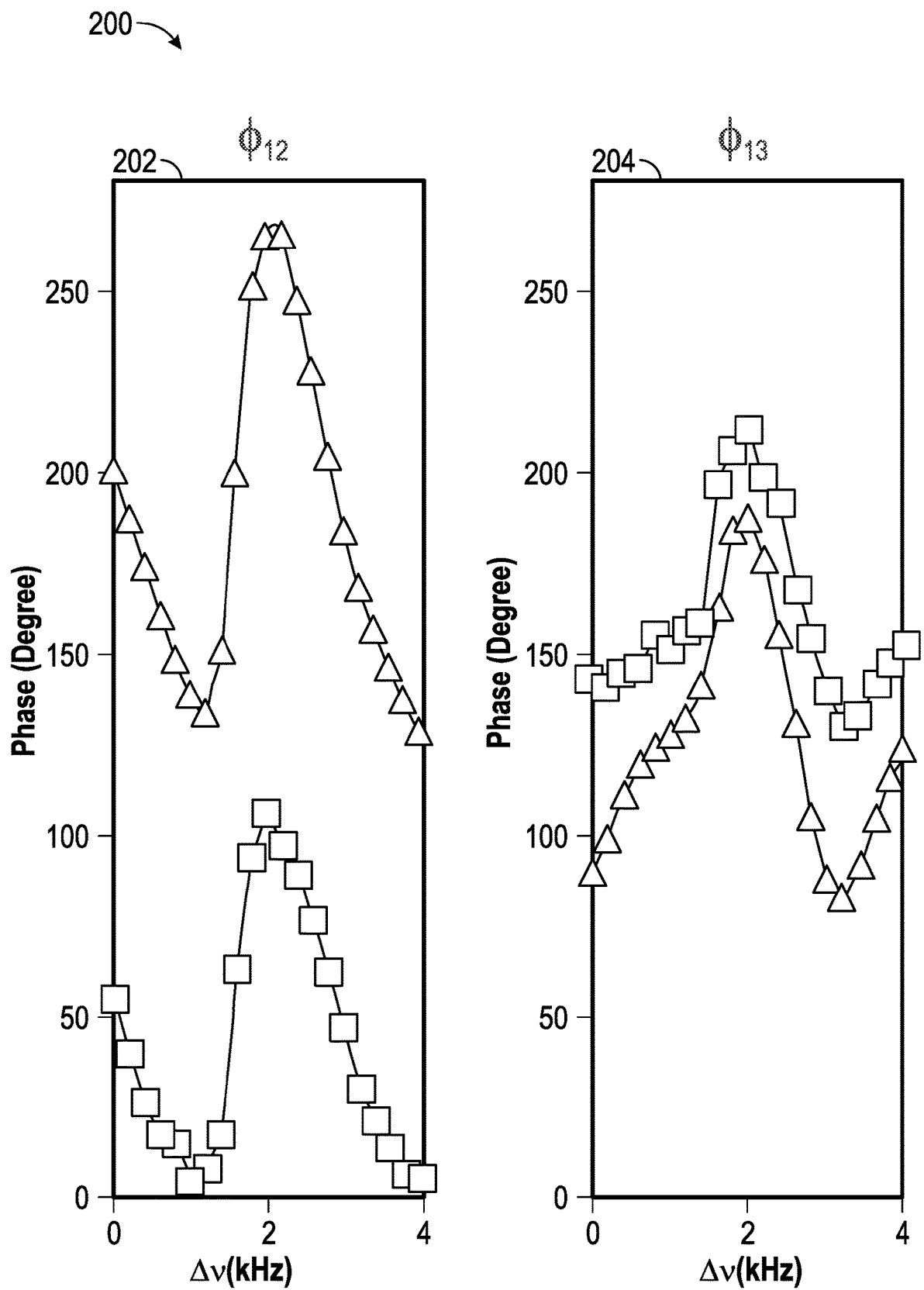
FIG. 2A is a graph depicting experimental phase differences between the coupled waveguides ($\varphi_{12}$ and $\varphi_{13}$) for the two logical phi-bits (9,15)
Figure 2B:
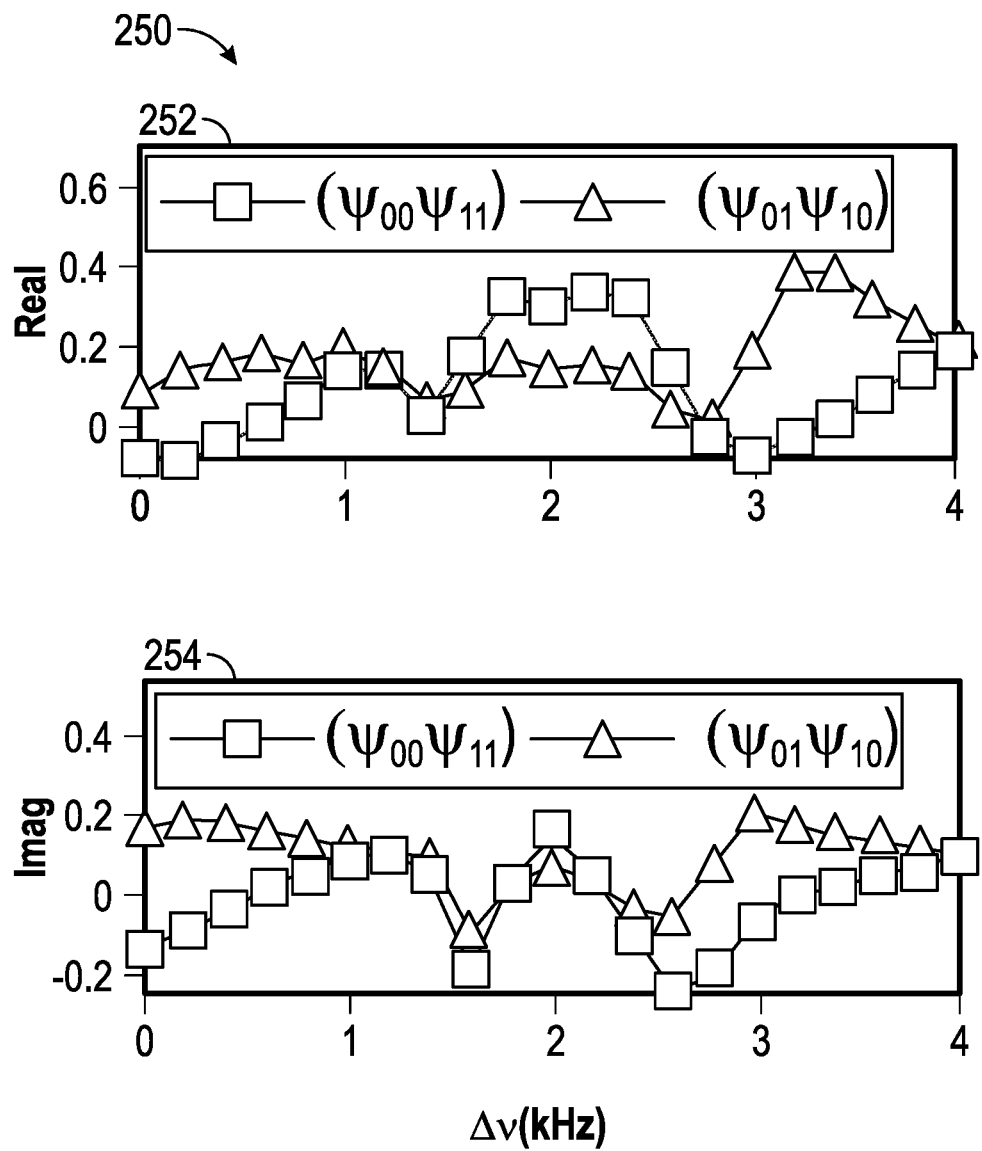
FIG. 2B is a graph plotting the real and imaginary components of $\psi_{01}\psi_{10}$ and $\psi_{00}\psi_{11}$.

FIG. 2A is a graph 200 depicting experimental phase differences between the coupled waveguides ($\varphi_{12}$ and $\varphi_{13}$) for the two logical phi-bits (9,15) (e.g., a first plot 202 corresponds to $\varphi_{12}$ and a second plot 204 corresponds to $\varphi_{13}$). In the plots 202 and 204, open circles correspond to $\varphi_{12}^{(9)}$ and $\varphi_{12}^{(9)}$ and open squares correspond to $\varphi_{12}^{(15)}$ and $\varphi_{13}^{(15)}$. FIG. 2B is a graph 250 depicting real and imaginary components of $\psi_{01}\psi_{10}$ and $\psi_{00}\psi_{11}$ (e.g., a first plot 252 corresponds to the real components and a second plot 254 corresponds to the imaginary components).

More particularly, in FIG. 2A, the experimental phase differences of the two logical phi-bits (9, 15) (e.g., $\varphi_{12}^{(9)}$, $\varphi_{12}^{(15)}$, $\varphi_{13}^{(9)}$, $\varphi_{13}^{(15)}$) are plotted for different values of the experimental detuning frequency parameter $\Delta v$.

In FIG. 2B, the real and imaginary components of $\psi_{01}\psi_{10}$ and $\psi_{00}\psi_{11}$ are plotted. As illustrated, it can be seen that at $\Delta v$=1.2 KHz or 4.0 KHz, the state of the two logical phi-bits (9,15) is separable, since both Real($\psi_{01}\psi_{10}$)≈Real($\psi_{00}\psi_{11}$) and Imag($\psi_{01}\psi_{10}$)≈Imag ($\psi_{00}\psi_{11}$).

For other detuning frequencies, the entropy of entanglement is non-zero indicating a nonseparable state, and at $\Delta v$=3.2 kHz the state displays a large entanglement entropy. To further demonstrate nonseparability in this representation of the superposition of elastic states, the entropy of entanglement of subsystems in the composite system can be calculated and is often non-zero. For this calculation, determine the density matrix ($\rho=|\psi_i\rangle\langle\psi_i|$) can be determined and the reduced density matrix associated with a partition of the system is calculated. The concept of reduced density matrix was first introduced by Dirac in 1930 and is calculated here by first taking the partial trace over one subsystem (one phi-bit) of the bipartite system constituted of the logical phi-bits pair (9,15) (e.g., either $\rho_9 = tr_{15}(\rho)$ or $\rho_{15} = tr_9(\rho)$).

The classical "entanglement" between the phi-bits pair (9,15) can then be characterized through the calculation of an "entanglement" measure, such as von Neumann's entropy of reduced states:

$$S(\rho_9) = -tr(\rho_9 \log(\rho_9)) = S(\rho_{15}) = -tr(\rho_{15} \log(\rho_{15})).$$

Note also that other entanglement measures, such as negativity or concurrence can also be used without departing from the scope of the present disclosure.

FIG. 3A depicts a plot 300 of the calculated entropy of partially traced states for different values of $\Delta v$. The entropy of entanglement is normalized to log2 (e.g., $S_9(\rho)$/log2 (or $S_{15}(\rho)$/log2)). In particular, FIG. 3A illustrates variations in the entropy of entanglement $S(\rho)$ values of the partially traced states $S(\rho_9)$ or $S(\rho_{15})$ of the two logical phi-bits (9,15).

The plot 300 of FIG. 3A demonstrates that the entropy of entanglement varies over a very wide range of values from 0 to approaching 1 by merely tuning the parameter $\Delta v$. This result shows that a sizable portion of the Hilbert space defined by this phi-bit pair can be explored and that this portion of the Hilbert space can be experimentally accessed including nonseparable, as well as occasionally separable states.

Figure 4A:
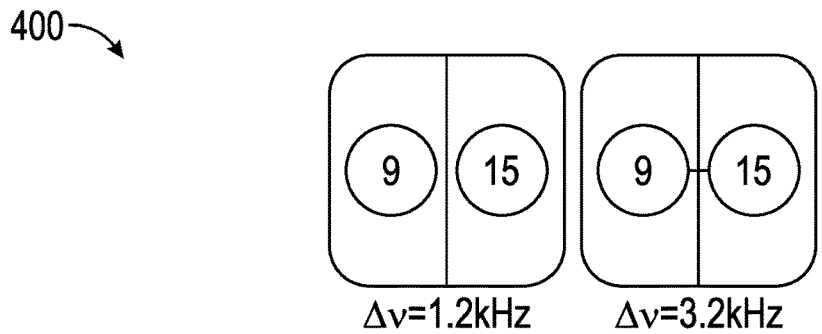
FIG. 4A is a graph illustrating nonseparability of states in an example N=2 logical phi-bit composite subsystem and shows a 1-1 partitioning of the N=2 logical phi-bit subsystem into two single logical phi-bits at two different values of a frequency tuning parameter $\Delta v$.

The contrast between separable and nonseparable states for this phi-bit pair is schematically illustrated in the diagram 400 of FIG. 4A for two values of $\Delta v$. It is noted that a detailed calculation of the entropy of entanglement values for those $\Delta v$ can be found in Appendix D. More particularly, in the diagram 400 of FIG. 4A (and the diagrams 410, 420, 430 corresponding to FIGS. 4B, 4C, 4D, respectively), composite systems are illustrated as squares surrounding logical phi-bits depicted as numbered circles or ellipses having a solid fill. Nonseparability of phi-bit subsystems is illustrated by solid link lines between phi-bits, with various partitioning illustrated by solid, short and long dashed black lines. A partitioning line intersecting a solid link between phi-bits represents a non-zero entropy of entanglement.

With respect to FIG. 4A in particular, the diagram 400 depicts a 1-1 partitioning of a N=2 phi-bit system into two single phi-bits at the two detuning frequencies, $\Delta v$=1.2 and 3.2 kHz. The first case is fully separable, the latter is inseparable.

N=3 Logical Phi-Bits

For a state with more than two phi-bits, the variety of "entangled" states is much richer. To characterize such states, the reduced density matrix and entropy of entanglement of the phi-bit triplet 2, 9, and 15 can be calculated.

Their state can be determined by the phase differences $(\varphi_{12}^{(2)}, \varphi_{13}^{(2)})$, $(\varphi_{12}^{(9)}, \varphi_{13}^{(9)})$ and $(\varphi_{12}^{(15)}, \varphi_{13}^{(15)})$.

The reduced density matrix can first be evaluated by tracing over either of the individual phi-bits ($\rho_2$, $\rho_9$, $\rho_{15}$), and the entanglement entropy of these partially traced states ($S(\rho_2)$, $S(\rho_9)$, $S(\rho_{15})$) can subsequently be calculated for different values of $\Delta v$. These entropies are depicted in FIG. 3B, which is a plot 310 of the calculated entropy of partially traced states for different values of $\Delta v$. The entropy of entanglement is normalized to log2. In particular, the plot 310 of FIG. 3B illustrates variations in the entropy of entanglement $S(\rho)$ values of the partially traced states ($S(\rho_2)$, $S(\rho_9)$, $S(\rho_{15})$) of the three phi-bits (2, 9, 15).

For states composed of three subsystems, nonseparable states are predominantly found. Under special circumstances, there are several states either fully separable or biseparable. Since all the three entropy values of the partially traced states are almost zero at $\Delta v=1.4$ kHz, the state vector corresponds to three logical phi-bits in a fully separable state (e.g., $\psi_{2,9,15} \approx \psi_2 \otimes \psi_9 \otimes \psi_{15}$).

However, at different values of $\Delta v$ (e.g., either at $\Delta v=1.2$ kHz or $\Delta v=4.0$ kHz), it can be seen that only $S(\rho_{15}) \approx 0$ and $S(\rho_2) \neq 0 S(\rho_9)$, which corresponds to a biseparable state that can be separated in a two phi-bit nonseparable state and a single separable phi-bit (e.g., $\psi_{2,9,15} \approx \psi_{2,9} \otimes \psi_{15}$).

Figure 4B:
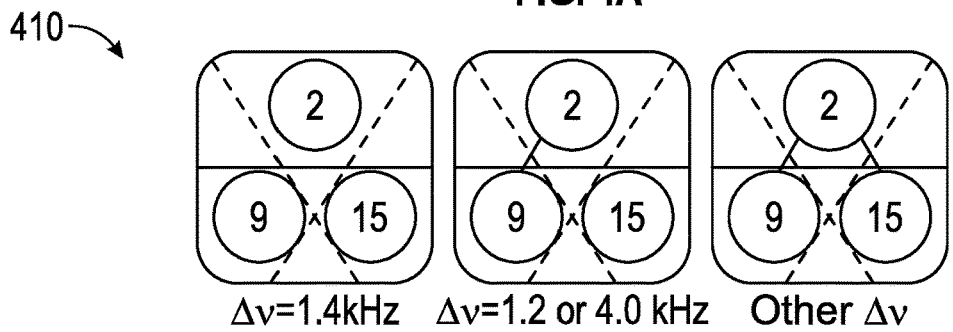
FIG. 4B is a graph illustrating nonseparability of states in an example N=3 logical phi-bit composite subsystem and shows a 1-2 partitioning of the N=3 logical phi-bit subsystem into one logical phi-bit and a second subsystem containing two logical phi-bits, at different values of a frequency tuning parameter $\Delta v$.

The contrast between separable and nonseparable states for this phi-bit triplet is schematically illustrated in the diagram 410 of FIG. 4B for different values of the detuning parameter $\Delta v$. As noted previously, details of a calculation of the entropy of entanglement values for $\Delta v$ can be found in Appendix D. More particularly, in the diagram 410 of FIG. 4B, composite systems are illustrated as squares surrounding logical phi-bits depicted as numbered circles or ellipses having a solid fill. Nonseparability of phi-bit subsystems is illustrated by solid link lines between phi-bits, with various partitioning illustrated by solid, short and long dashed black lines. A partitioning line intersecting a solid link between phi-bits represents a non-zero entropy of entanglement.

With respect to the diagram 410 of FIG. 4B in particular, depicted is a partitioning of N=3 phi-bits into one phi-bit and a second subsystem containing two phi-bits. At $\Delta v=1.4$ kHz, the entropy of entanglement for each type of 1-2 partition is almost zero and the three phi-bits are fully separable. At $\Delta v=1.2$ or 4.0 kHz (e.g., the left and middle panels of FIG. 4B), separating phi-bit 15 from the other two phi-bits leads to almost zero entropy, observable in that the long-dashed black line in the left and middle panels of FIG. 4B does not intersect a blue link, e.g., a biseparable state.

The other partitioning of the N=3 phi-bit system for other $\Delta v$ (e.g., the right panel of FIG. 4B) leads to non-zero entropies of entanglement, e.g., it can be seen that phi-bits 2 and 9 are linked together by a solid thick line, with both the solid partitioning line and the short-dashed partitioning line intersecting the link between phi-bits 2 and 9. For most detuning frequencies $\Delta v$, nonseparability is illustrated by intersection between one or more of the three types of partitioning lines (e.g., the relatively thin black lines presented as solid, short-dashed, and long-dashed lines) and the relatively thick, solid blue lines representing links between the phi-bits.

N=4 Logical Phi-Bits

In addition to finding separable, bi-separable and nonseparable states for the case of two and three phi-bit pairs (e.g., as described above for N=2 and FIG. 3A, and for N=3 and FIG. 3B, respectively), it can be expected that for the case of four phi-bits that the size of the Hilbert space and hence the variety of states would be even richer. Hence, the disclosure turns now to focus on a composite system composed of four logical phi-bits (2,9,15,16).

Figure 3C:
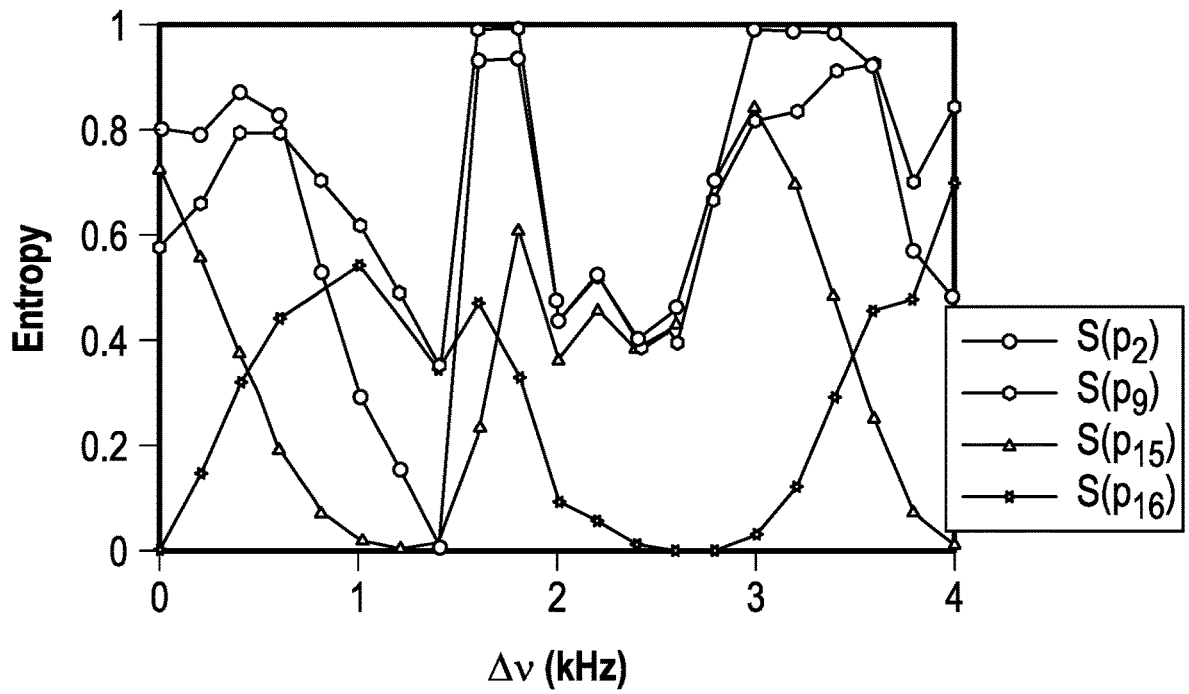
FIG. 3C is a graph depicting the calculated entropy of partially traced states for different values of a frequency tuning parameter $\Delta v$ in an example N=4 logical phi-bit composite subsystem.
Figure 3C:
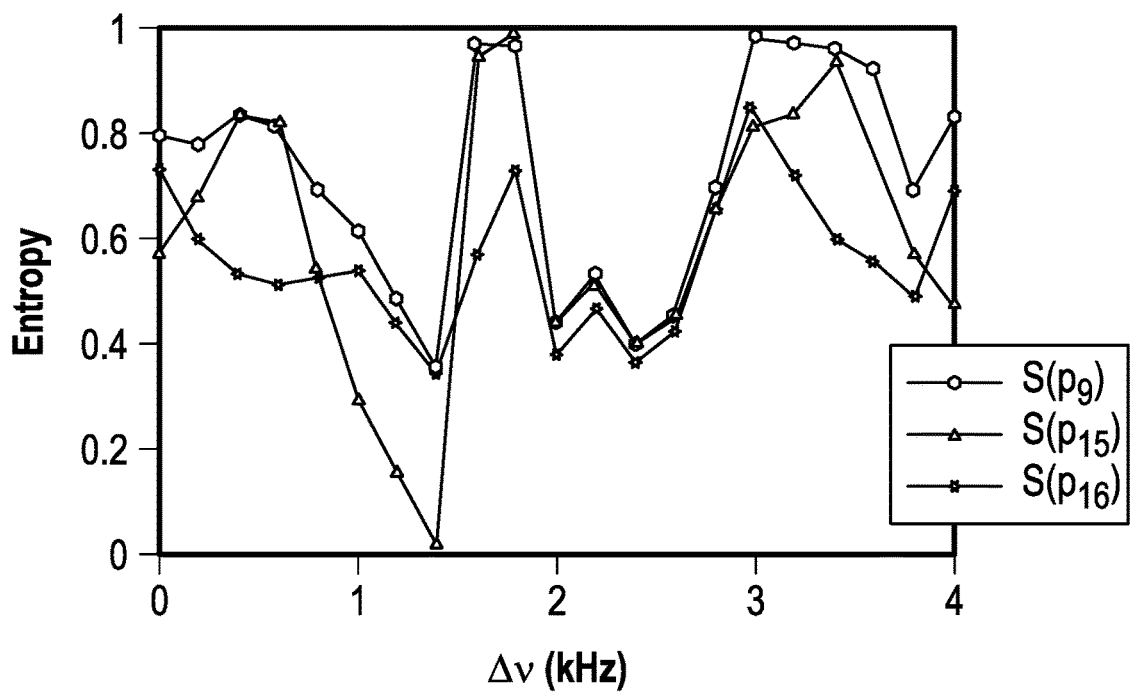

FIG. 3C depicts plots 322, 324 of the calculated entropy of partially traced states for different values of $\Delta v$. The entropy of entanglement is normalized to log2. In particular, the left plot 322 of FIG. 3C illustrates variations in the entropy of entanglement $S(\rho)$ values of the four phi-bits (2, 9, 15, 16) obtained by taking the partial trace over one subsystem composed of one phi-bit (e.g., ($S(\rho_2)$, $S(\rho_9)$, $S(\rho_{15})$, $S(\rho_{16})$)).

The right plot 324 of FIG. 3C illustrates variations in the entropy of entanglement $S(\rho)$ values of the four phi-bits (2, 9, 15, 16) obtained by taking the partial trace over a subsystem composed of two phi-bits (e.g., $S(\rho_{2,9})$, $S(\rho_{2,15})$, $S(\rho_{2,16})$).

The plots 322, 324 of FIG. 3C depict mostly nonseparable states which comprise the vast majority of the 24-dimensional Hilbert space of the four phi-bit composite system. Note that for the detuning frequency of $\Delta v=1.4$ kHz, an unusual circumstance can be seen where $S(\rho_2)$, $S(\rho_{15})$ (e.g., FIG. 3C left plot 322) and $S(\rho_{2,15})$ (e.g., FIG. 3C right plot 324) have entanglement entropies near zero.

Therefore, at that detuning frequency the state can be written as:

$$\psi_{2,9,15,16} = \psi_{2,15} \otimes \psi_{9,16} = \psi_2 \otimes \psi_{15} \otimes \psi_{9,16}.$$

This state is naturally biseparable between pairs of phi-bits (2,15) and (9,16). It is clear from the entanglement entropies that the states that can be explored in the representation(s) described herein, defined by the choice of coefficients, are quite expansive even in the case of only 4 logical phi-bits and the limited number of detuning frequencies chosen in the above examples.

Figure 4C:
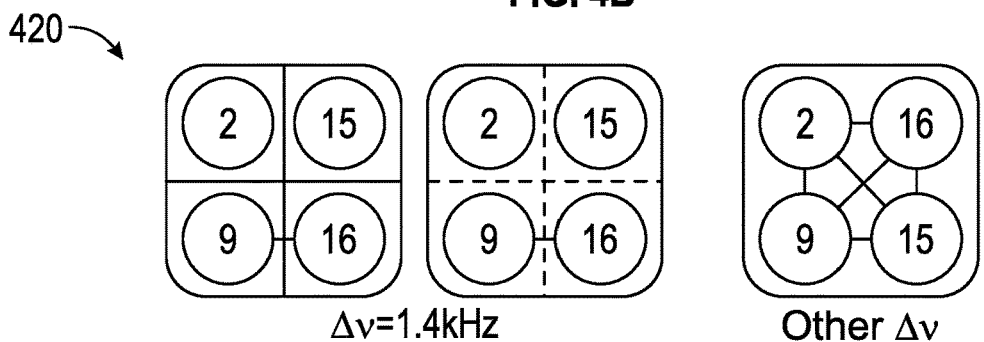
FIG. 4C is a graph illustrating nonseparability of states in an example N=4 logical phi-bit composite subsystem at different values of the frequency tuning parameter $\Delta v$.

For a conceptual interpretation of the results presented in FIG. 3C, provided is the graphical representation 420 of FIG. 4C, which depicts the states of the four phi-bit (2, 9, 15, 16) system. As noted previously, in the diagram 420 of FIG. 4C, composite systems are illustrated as squares surrounding logical phi-bits depicted as numbered circles or ellipses having a solid fill. Nonseparability of phi-bit subsystems is illustrated by solid link lines between phi-bits, with various partitioning illustrated by solid, short and long dashed black lines. A partitioning line intersecting a solid link between phi-bits represents a non-zero entropy of entanglement.

With respect to FIG. 4C in particular, as illustrated in diagram 420 a partition can be determined between every individual phi-bit and the other three remaining phi-bits, wherein the partitioning is represented by solid lines making a right angle and cutting out a quadrant of the complete system. At $\Delta v=1.4$ kHz, phi-bits 2 and 15 are separable from the rest of the system, as can be seen in the left panel of diagram 420.

Separating phi-bit 9 or 16 from the remaining three phi-bits leads to nonzero entropies of entanglement indicating that these two phi-bits 9 and 16 are nonseparable. This state is confirmed by partitioning into two halves, depicted by the short and long dashed line in the middle panel of diagram 420. A non-zero entropy associated with the intersection between the long-dashed line and the link between phi-bits 9 and 16 confirms nonseparability. At any other detuning frequency, where the 1-3 and 2-2 partitioning give a non-zero entropy of entanglement, the system is nonseparable. For example, any partitioning will lead to an intersection of the black lines with blue links, as can be seen in the right panel of diagram 420.

N=16 Logical Phi-Bits

Having established the insights that can be gained by examining the entanglement entropies for the cases of N=2, 3, 4 phi-bits, as described above with respect to FIGS. 3A-C and FIGS. 4A-C, both respectively, the discussion turns now to consider the $2^{16}$-dimensional Hilbert space defined by the 16 phi-bits listed in Table 1:

TABLE 1

List of logical phi-bits, for example as can be identified from the depiction presented in FIG. 1B. The logical phi-bits are listed in the order of increasing frequencies. Columns 3 and 4 list the minimum entropy of entanglement and the maximum entropy of entanglement values, respectively, for a single phi-bit traced state. Detuning frequencies $\Delta v$ corresponding to these maxima and minima are shown parenthetically.

| Phi-bit | Frequency | Minimum entropy of entanglement | Maximum entropy of entanglement |
|---|---|---|---|
| 1 | $f_1 - 4\Delta f$ | 0.19 (0 kHz) | 0.9995 (2.4 kHz) |
| 2 | $f_1 - 3\Delta f$ | 0.005 (1.4 kHz) | 0.976 (0.4 kHz) |
| 3 | $f_1 - 2\Delta f$ | 0.008 (0.4 kHz) | 0.9966 (2.2 kHz) |
| 4 | $f_1 - \Delta f$ | 0.24 (0 kHz) | 0.87 (1.2 kHz) |
| 5 | $f_2 + \Delta f$ | 0.001 (2.6 kHz) | 0.3 (0.4 kHz) |
| 6 | $f_1 + f_2 - 3\Delta f$ | 0.005 (1.8 kHz) | 0.994 (3.6 kHz) |
| 7 | $f_1 + f_2 - 2\Delta f$ | 0.16 (4 kHz) | 0.99 (1.4 kHz) |
| 8 | $f_1 + f_2 - \Delta f$ | 0.11 (0.4 kHz) | 0.995 (0.2 kHz) |
| 9 | $f_1 + f_2$ | 0.58 (0 kHz) | 0.943 (1.2 kHz) |
| 10 | $2f_1 + f_2 - 5\Delta f$ | 0.007 (1.4 kHz) | 1 (0.2 kHz) |
| 11 | $2f_1 + f_2 - 4\Delta f$ | 0.007 (1.8 kHz) | 1 (0.2 kHz) |
| 12 | $2f_1 + f_2 - 3\Delta f$ | 0.001 (3.6 kHz) | 1 (3.2 kHz) |
| 13 | $2f_1 + f_2 - 2\Delta f$ | 0.003 (1 kHz) | 1 (4 kHz) |
| 14 | $2f_1 + f_2 - \Delta f$ | 0.005 (0.2 kHz) | 1 (3 kHz) |
| 15 | $2f_1 + f_2$ | 0.007 (1.2 kHz) | 0.75 (0 kHz) |
| 16 | $2f_1 + f_2 + \Delta f$ | 0.002 (2.6 kHz) | 0.594 (1 kHz) |

Table 1 depicts the logical phi-bits listed in order from logical phi-bit 1 to logical phi-bit 16, ordered from low to high frequency. Table 1 additionally provides a listing, for each logical phi-bit, of the minimum and maximum values of the calculated entanglement entropy and their corresponding detuning frequencies $\Delta v$. The entropy of entanglement is calculated for a partitioning of the system into one of the logical phi-bits and another subsystem composed of the 15 other remaining logical phi-bits (e.g., a 1-15 partition). Even at a glance, it can be observed from Table 1 that wide variations in entanglement entropies are present, and furthermore that there are extrema at many different detuning frequencies $\Delta v$ for differing partitionings of the logical phi-bits, suggesting that the approaches described herein are suitable for or otherwise capable of accessing a large portion of the Hilbert space.

For an elastic state with sixteen logical phi-bits and the vast $2^{16}$- dimensional Hilbert space, the composite system described herein can be partitioned in numerous ways, and hence, to study the entropy of entanglement values of all possible partial traced states is a formidable task. To illustrate the complexity of the nonseparable, and occasionally separable states, for the present example of a 16 logical phi-bit system, the entropy of entanglement values are first calculated by taking the partial trace over all one phi-bit subsystems ($S(\rho_1)$, $S(\rho_2)$, . . . , $S(\rho_{16})$).

Figure 5A:
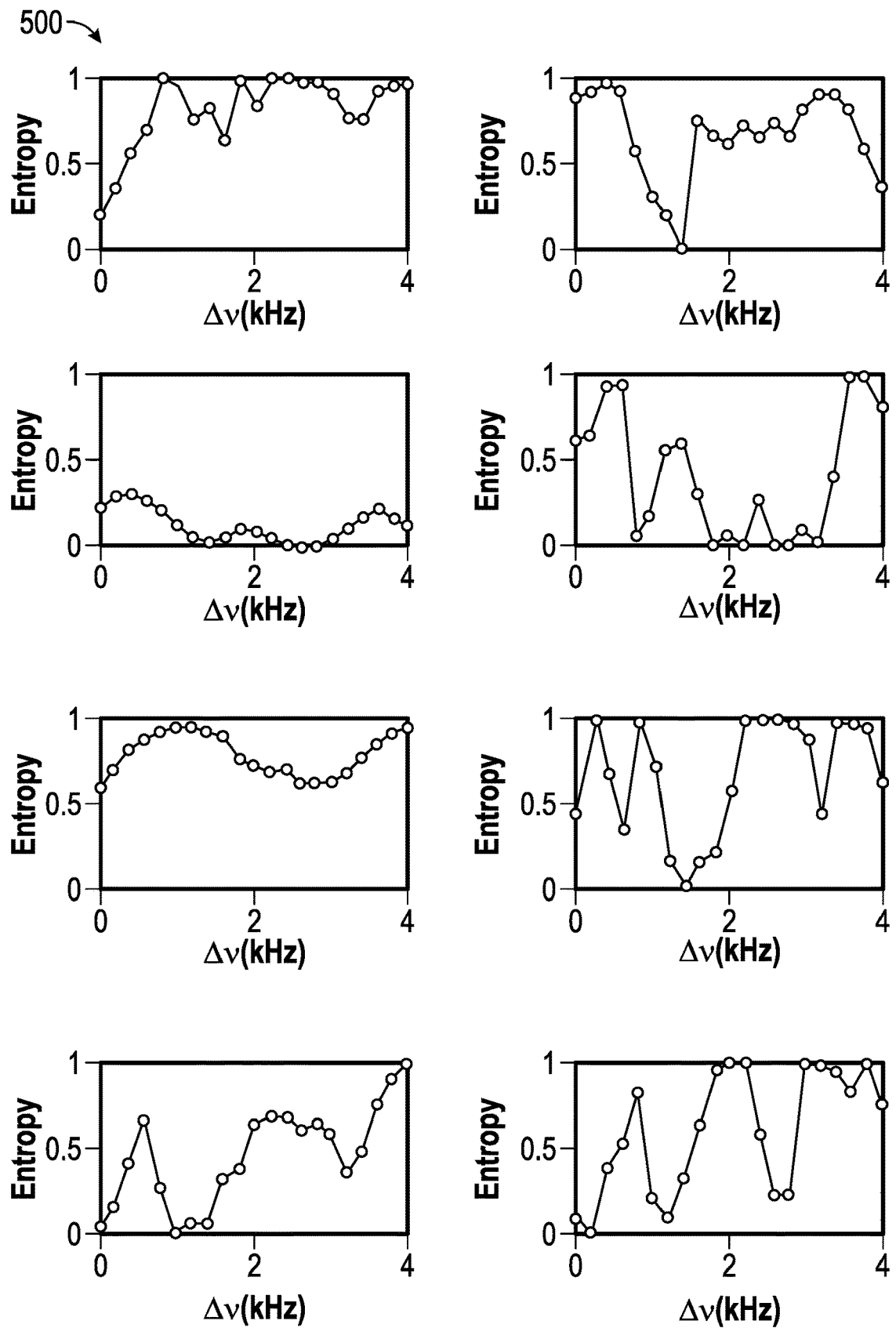
FIG. 5A illustrates variations in the entropy of entanglement of an example 16 logical phi-bit system and depicts a 1-15 partition in which entropy of entanglement is calculated by taking the partial trace over a one logical phi-bit subsystem ($S(\rho_1), S(\rho_2), \ldots, S(\rho_{16})$)
Figure 5A:
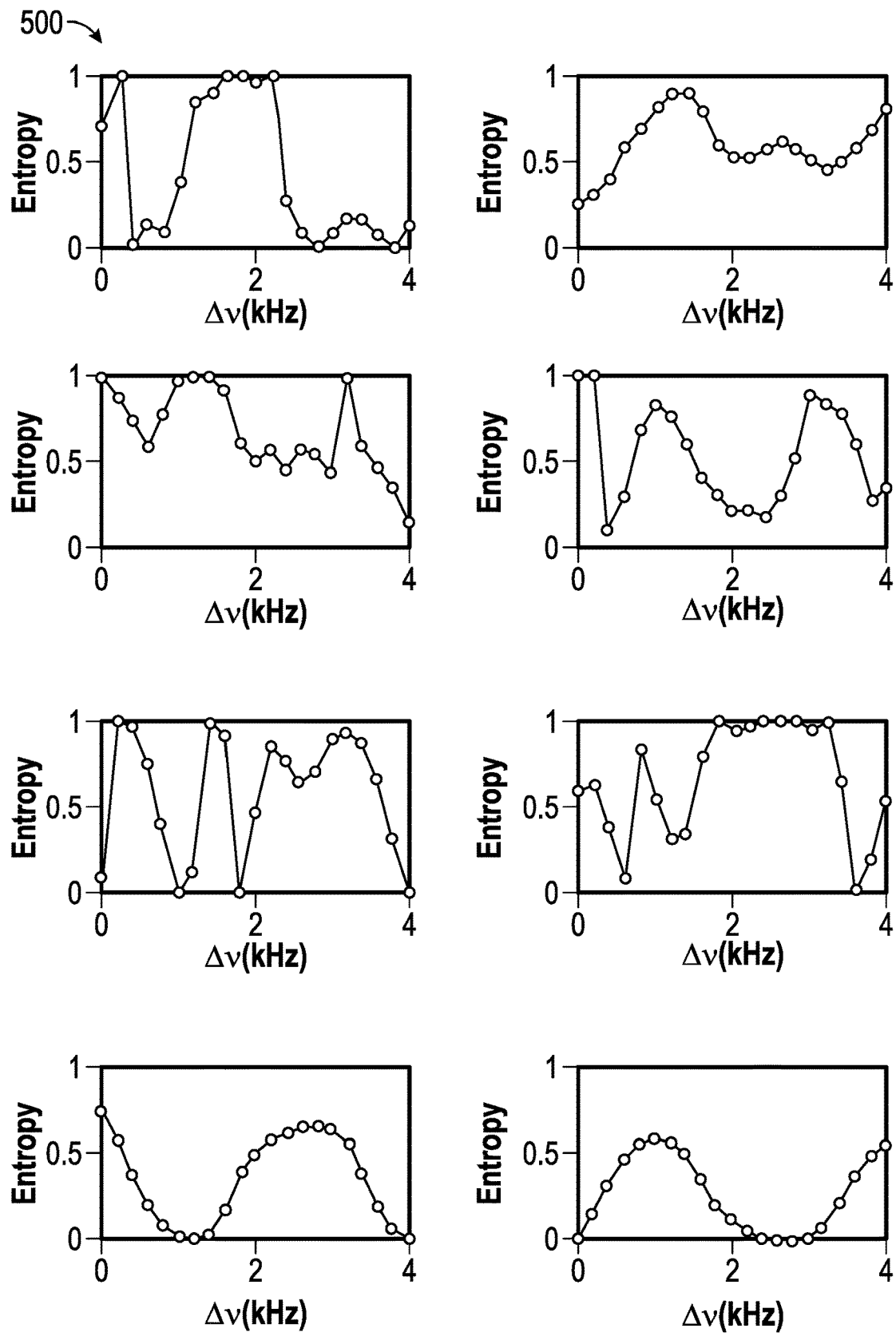

The calculated entropy of entanglement for different values of $\Delta v$ is depicted in the graphs 500 of FIG. 5A., which illustrate variations in the entropy of entanglement of the example 16 logical phi-bit system described herein. The entropy is normalized to log2. More particularly, FIG. 5A depicts a 1-15 partition in which entropy of entanglement is calculated by taking the partial trace over a one phi-bit subsystem ($S(\rho_1)$, $S(\rho_2)$, . . . , $S(\rho_{16})$). The entropy of entanglement of the resulting 1-15 phi-bit partitions are shown from top left graph (corresponding to phi-bit 1) to the bottom right graph (corresponding to phi-bit 16).

As is evident from FIG. 5A, for states composed of the sixteen subsystems the variety of entangled states is much richer. Through the frequency tuning parameter $\Delta v$, the entropy of entanglement values can be varied across the full spectrum of 0 to 1, in units of log2. Even though the Hilbert space is comprised mainly of nonseparable states, occasional separable phi-bits can still be found, for example as is shown for the detuning frequency value of $\Delta v=1.0$ KHz.

For example, for the detuning frequency value of $\Delta v=1.0$ KHz it can be seen from FIG. 5A that $S(\rho_{13}) \approx 0 \approx S(\rho_{15})$. It can then be written that:

$$\psi_{1,\ldots,16} \approx \psi_{13} \otimes \psi_{1,\ldots,12,14,\ldots,16} \text{ and } \psi_{1,\ldots,16} \approx \psi_{15} \otimes \psi_{1,\ldots,14,16}.$$

Figure 5B:
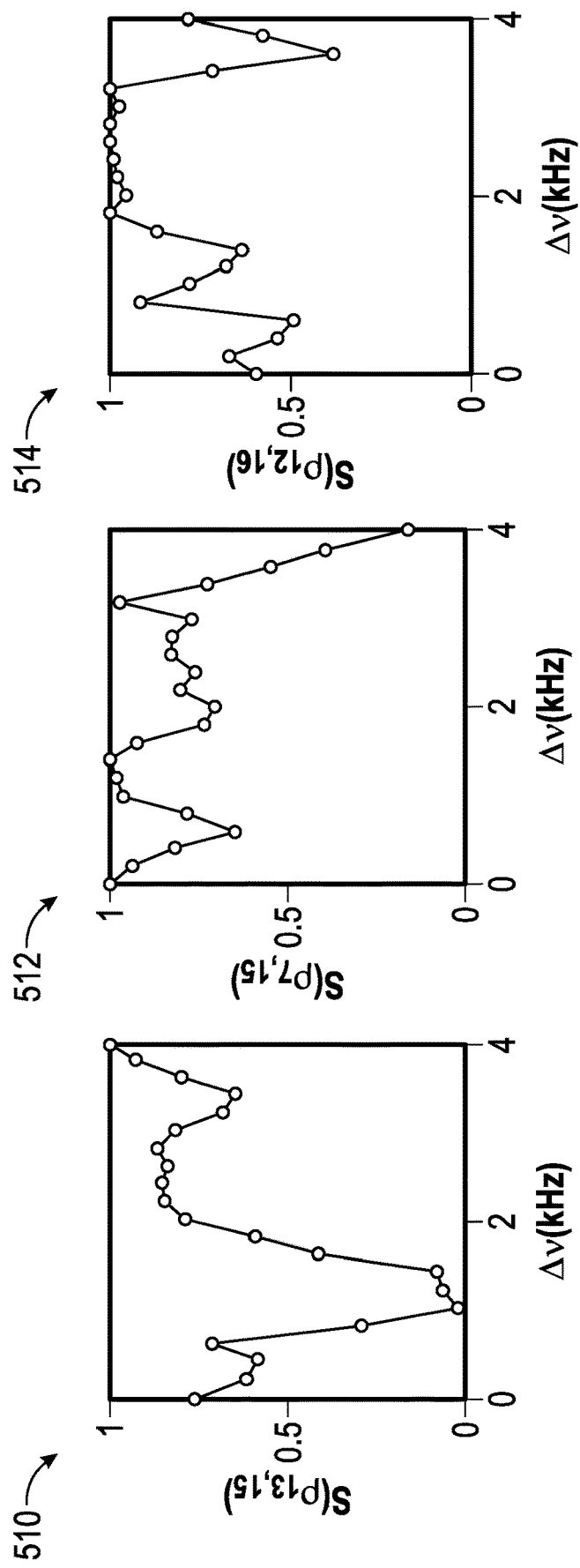
FIG. 5B illustrates variations in the entropy of entanglement of an example 16 logical phi-bit system and depicts a 2-14 partition in which entropy of entanglement is calculated by taking the partial trace over two logical phi-bit subsystems ($S(\rho_{13,15}), S(\rho_{7,15}), S(\rho_{12,16})$)

With respect to FIG. 5B, depicted is a series of three graph panels 510, 512, 514 each depicting variations in the entropy of entanglement of the 16 logical phi-bit system, wherein the entropy is normalized to log2. In particular, the graph panels 510-514 of FIG. 5B illustrate a 2-14 partition in which entropy of entanglement is calculated by taking the partial trace over subsystems comprising two logical phi-bits, e.g., $S(\rho_{13,15})$, $S(\rho_{7,15})$, $S(\rho_{12,16})$.

The formulation provided above, e.g., $\psi_{1,\ldots,16} \approx \psi_{13} \otimes \psi_{1,\ldots,12,14,\ldots,16}$ and $\psi_{1,\ldots,16} \approx \psi_{15} \otimes \psi_{1,\ldots,14,16}$, may become more evident from calculating the entropy of entanglement value by taking the partial trace over a two logical phi-bit subsystem (e.g., a 2-14 partition). With reference now to the left graph panel 510 of FIG. 5B, it can be given that:

$$\psi_{1,\ldots,16} \approx \psi_{13,15} \otimes \psi_{1,\ldots,12,14,16}.$$

On the other hand, since $S(\rho_7) \neq 0$ at $\Delta v=1.0$ kHz (e.g., as can be seen in FIG. 5A), it can be determined that the combined state is nonseparable and accordingly, it cannot be written that: $\psi_{1,\ldots,16} \approx \psi_{7,15} \otimes \psi_{1,\ldots,6,8,\ldots,14,16}$ (e.g., FIG. 5B middle graph panel 512) even though $S(\rho_{15}) \approx 0$ at $\Delta v=1.0$ KHz.

Figure 4D:
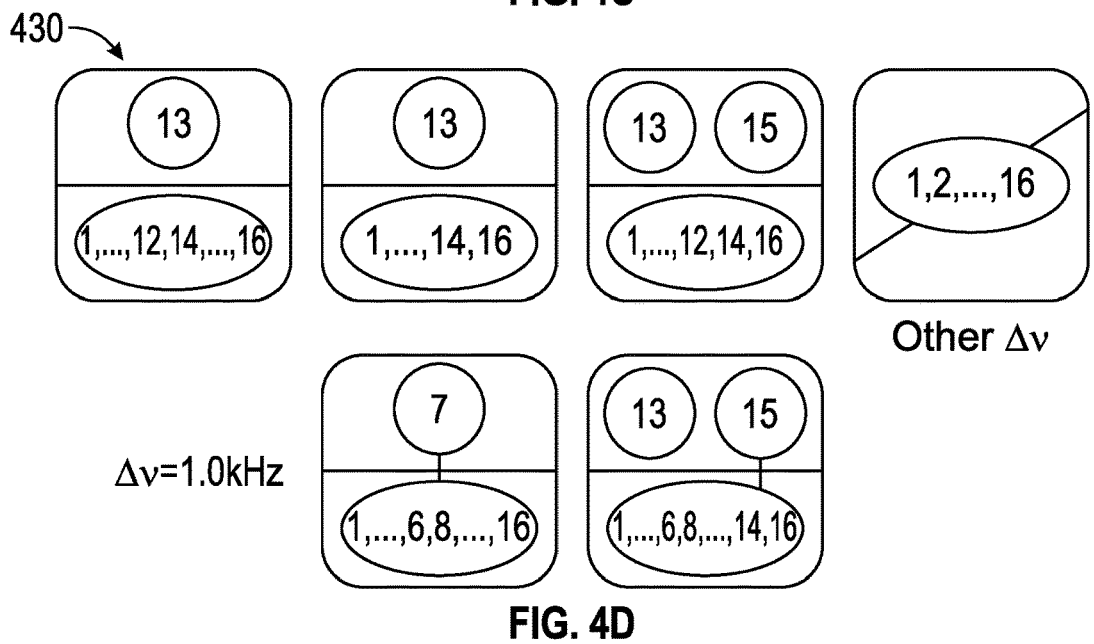
FIG. 4D is a graph illustrating nonseparability of states in an example N=16 logical phi-bit system and depicts different partitions of the N=16 logical phi-bit system showing separability and nonseparability at different values of the frequency tuning parameter $\Delta v$.

A graphical illustration of nonseparability in the present example of an N=16 logical phi-bit system is depicted in the diagram 430 of FIG. 4D. As noted previously, in the depiction of FIG. 4D, composite systems are illustrated as squares surrounding logical phi-bits depicted as numbered circles or ellipses having a solid fill. Nonseparability of phi-bit subsystems is illustrated by solid link lines between phi-bits, with various partitioning illustrated by solid, short and long dashed black lines. A partitioning line intersecting a solid link between phi-bits represents a non-zero entropy of entanglement.

With respect to diagram 430 of FIG. 4D in particular, an example N=16 logical phi-bit system is illustrated as being separated into different partitions to show separability and nonseparability (e.g., as illustrated by the solid black lines depicting different partitions in each of the six individual panels included in diagram 430). Note that solid-fill blue ellipses with numerical labels are used to illustrate composites of more than one logical phi-bit.

Tracing out one of the logical phi-bits 13 or 15 from the other 15 logical phi-bits at $\Delta v=1.0$ KHz shows the separability of these logical phi-bits on their own, as can be seen in the top left panel of diagram 430 of FIG. 4D.

It is expected that partitioning both logical phi-bits 13 and 15 from the other 14 logical phi-bits at this detuning frequency will also be separable, for example as is demonstrated in FIGS. 5A-5B and as is illustrated in the second from the right panel of diagram 430 of FIG. 4D.

It is further noted that the entropy of entanglement obtained by tracing out logical phi-bit 7 shows that it is nonseparable from the other 15 logical phi-bits, for example as can be seen from the bottom left panel of diagram 430 of FIG. 4D. Accordingly, a nonseparable state can once again be found by tracing out logical phi-bits 7 and 15 from the 14 other remaining logical phi-bits, for example as can be seen from the bottom right panel of diagram 430 of FIG. 4D. Detuning conditions for which none of the individual logical phi-bits can be separated from the other 15 logical phi-bits suggests states that are non-separable, for example as can be seen from the top right panel of diagram 430 of FIG. 4D. It is further noted that this non-separability would be occurring for any type of partitioning.

In some embodiments, it is contemplated that the complexity of the 16 logical phi-bit representation of the $2^{16}$-dimensional Hilbert space (e.g., as described herein) would allow for many other ways of partitioning the logical phi-bits into groups, and importantly, with most of these partitions leading to nonseparable states that are the signature of classical entanglement.

Discussion

Figure 6:
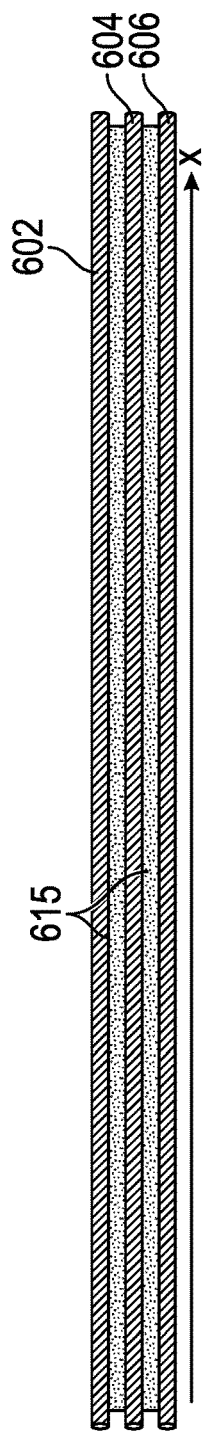
FIG. 6 illustrates a schematic of parallel arrays of three coupled waveguides.

As contemplated and described herein, classical entanglement (e.g., based on nonseparability), is experimentally demonstrated for acoustic logical phi-bits resulting from the partitioning in the spectral domain of the acoustic field of an externally driven array of three acoustic waveguides elastically coupled along their length (e.g., such as the array 100 illustrated in FIG. 1A and/or the array 600 illustrated in FIG. 6).

Each logical phi-bit is a two-level nonlinear mode of vibration whose state is characterized by a frequency and two independent relative phases between waveguides. Multi logical phi-bit systems are analogous to qubit systems in the sense that their representation can be endowed with a tensor product structure scaling exponentially with the number N of bits.

The states of a composite system of N logical phi-bits can then be represented and manipulated in a $2^N$-dimensional Hilbert space. The nonseparability of multiple logical phi-bit superpositions of states has been characterized by calculating the entropy of entanglement of various partitions of four representative multi logical phi-bit composite systems, namely for the logical phi-bit quantities of N=2, 3, 4, and 16.

By partitioning the smaller composite systems (e.g., by partially tracing the density matrix used to calculate the entropy of entanglement), the existence of states with different degrees of classical entanglement are shown herein. For example, the existence of states with different degrees of classical entanglement ranging from separable, to bi-separable, to nonseparable, are shown.

Notably, the entropy of entanglement of a 16 logical phi-bit system partitioned in several ways (tracing out of the density matrix one logical phi-bit or pairs of logical phi-bits) indicates that large scale entangled states can be realized.

As described herein detuning the drivers' frequency of the externally driven classical acoustic system is one possible way to easily navigate a substantial portion of the Hilbert space of multi logical phi-bit representations. This approach disclosed herein can offer access to the $2^{16}$-dimensional Hilbert space, with access spanning much of the $2^{16}$-dimensional Hilbert space's complex nonseparable state volume.

It is noted that, according to some aspects of the present disclosure, it is not necessarily an aim to simulate quantum systems nor to establish a complete analogy with them. For instance, it may be considered that several features still distinguish composite logical phi-bit systems from true quantum systems, namely locality versus quantum nonlocality and superpositions of states involving amplitudes versus probability amplitudes.

The logical phi-bits described herein may be defined in the spectral domain, enabling their spatial co-location and thus doing away with any issue of distance in their interactions. Multi logical phi-bit superpositions of states are directly measurable by contact (e.g., using one or more transducers) and/or by non-contact methods (e.g., using laser ultrasonics). Composite logical phi-bit systems are stable against decoherence and do not suffer from wave function collapse upon measurement. The experimental results reported here and the analogy between classical and quantum entanglement within the framework of nonseparability suggest the possibility of harnessing the complexity of classical entanglement to challenge the current viewpoint on the superiority of quantum systems in meeting the needs of future information science.

Figure 7:
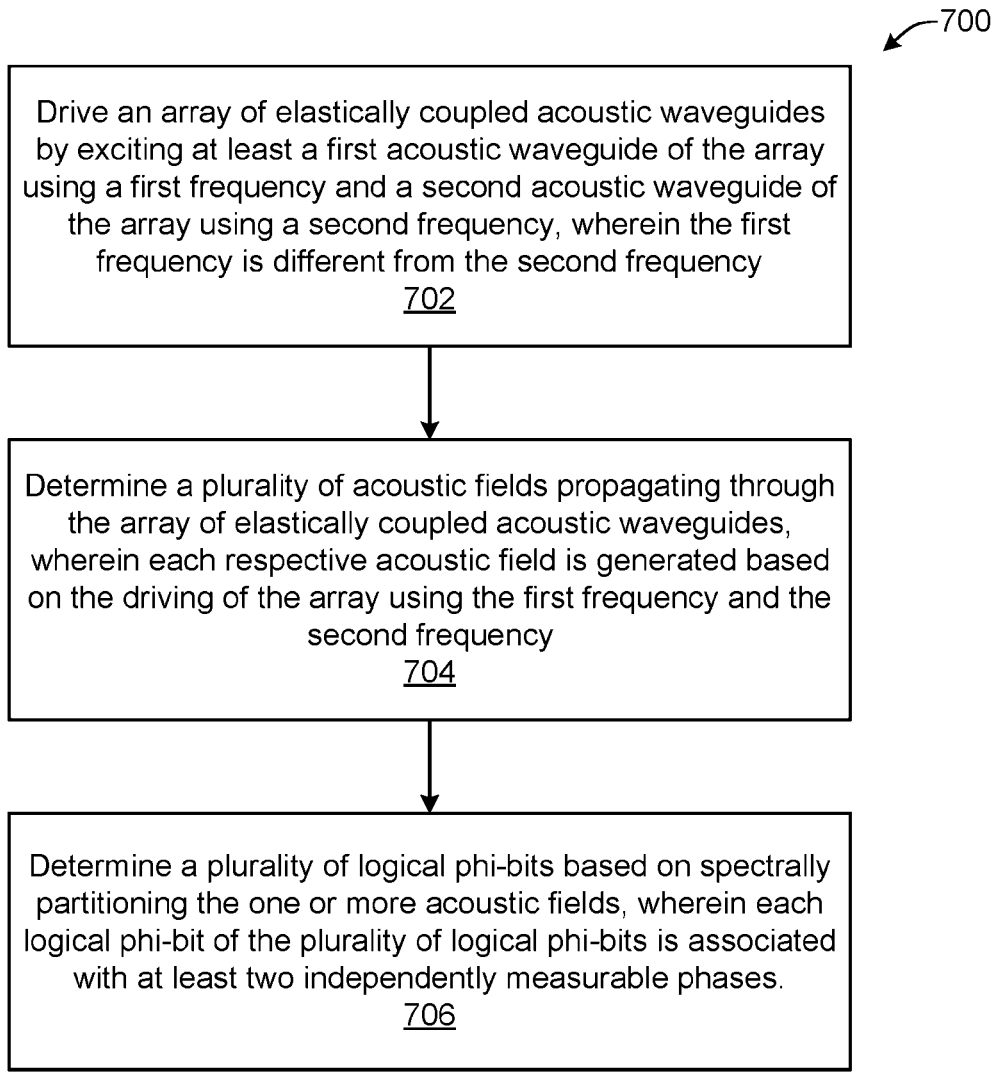
FIG. 7 is a flow diagram illustrating an example of a process for controllable classical entanglement using a multiple logical phi-bit quantum analogue system.

FIG. 7 is a flow diagram illustrating an example of a process 700 for implementing controllable classical entanglement using a multiple logical phi-bit quantum analogue system. For example, the controllable classical entanglement can be implemented or otherwise achieved using a multiple logical phi-bit quantum analogue system such as the system 100 depicted in FIG. 1A and/or the system 600 depicted in FIG. 6. Although the example process 700 depicts a particular sequence of operations, the sequence may be altered without departing from the scope of the present disclosure. For example, some of the operations depicted may be performed in parallel or in a different sequence that does not materially affect the function of the process 700. In some examples, different components of an example device or system that implements the process 700 may perform functions at substantially the same time or in a specific sequence.

At block 702, the process 700 includes driving an array of elastically coupled acoustic waveguides by exciting at least a first acoustic waveguide of the array using a first frequency and a second acoustic waveguide of the array using a second frequency, wherein the first frequency is different from the second frequency. In some examples, the array of elastically coupled acoustic waveguides can be the same as or similar to the array 100 of FIG. 1A and/or the array 600 of FIG. 6. In some cases, the array of elastically coupled acoustic waveguides can include at least three acoustic waveguides, such as the three acoustic waveguides depicted in the array 100 of FIG. 1A and/or the three acoustic waveguides 602, 604, 606 depicted in the array 600 of FIG. 6. In some examples, the array of elastically coupled acoustic waveguides comprises a planar array of metal rods (e.g., aluminum rods) coupled elastically along a longitudinal length of each respective metal rod.

At block 704, the process 700 includes determining a plurality of acoustic fields propagating through the array of elastically coupled acoustic waveguides, wherein each respective acoustic field is generated based on the driving of the array using the first frequency and the second frequency. For example, the array of elastically coupled acoustic waveguides can be driven using a plurality of external drivers, such as the external drivers 122a, 122b depicted in FIG. 1A. In some cases, each external driver of the plurality of external drivers can be coupled to an acoustic waveguide included in the array.

In some examples, the plurality of acoustic signals can be determined using a plurality of recording transducers. For example, the plurality of recording transducers can include one or more (or all) of the recording transducers 132a, 132b, 132c depicted in FIG. 1A. In some cases, a quantity of recording transducers can be greater than or equal to a quantity of external drivers. In some embodiments, a quantity of external drivers is less than or equal to a quantity of acoustic waveguides included in the array of elastically coupled acoustic waveguides. In some aspects, the quantity of recording transducers can be equal to the quantity of acoustic waveguides included in the array of elastically coupled acoustic waveguides, each recording transducer coupled to a different acoustic waveguide of the array.

In some embodiments, the plurality of external drivers (e.g., driving transducers 122a, 122b) are disposed at a first distal end of the array of elastically coupled acoustic waveguides and the plurality of recording transducers (e.g., the recording transducers 132a, 132b, 132c) are disposed at a second distal end of the array. The first distal end can be opposite from the second distal end. In some cases, a first external driver of the plurality of external drivers is used to excite the first acoustic waveguide using a waveform generated with the first frequency. For instance, the first external driver 122a can excite the first acoustic waveguide of array 100 using a waveform generated by first signal generator 126a with the first frequency $f_1$. A second external driver of the plurality of external drivers can be used to excite the second acoustic waveguide using a waveform generated with the second frequency. For instance, the second external driver 122b can excite the second acoustic waveguide of array 100 using a waveform generated by second signal generator 126b with the second frequency $f_2$. In some cases, the process 700 can include determining a corresponding signal (e.g., acoustic signal) for each acoustic field of the plurality of acoustic fields based on measurements obtained using one or more non-contact transducers associated with the array of elastically coupled acoustic waveguides. For example, the non-contact transducer(s) can be provided as laser ultrasonics systems.

At block 706, the process includes determining a plurality of logical phi-bits based on spectrally partitioning the one or more acoustic fields, wherein each logical phi-bit of the plurality of logical phi-bits is associated with at least two independently measurable phases. In some examples, determining the plurality of logical phi-bits can be based on mixing a plurality of driving frequencies associated with driving the array of elastically coupled acoustic waveguides (e.g., driving frequencies generated by the signal generators 126a, 126b and used to drive the array 100 via the first and second external drivers 122a, 122b respectively). In some cases, the plurality of driving frequencies includes at least the first frequency and the second frequency (e.g., $f_1$ and $f_2$, respectively).

In some examples, each logical phi-bit of the plurality of logical phi-bits can correspond to a respective nonlinear mode of a plurality of nonlinear modes with different mixed frequencies. Each respective nonlinear mode can be associated with a characteristic frequency based on frequency mixing of a plurality of driving frequencies used to drive the array of elastically coupled acoustic waveguides.

In some cases, the at least two independently measurable phases associated with each logical phi-bit comprise a first phase difference determined between a first phase measurement associated with the first acoustic waveguide and a second phase measurement associated with the second acoustic waveguide, and a second phase difference determined between the first phase measurement and a third phase measurement associated with a third acoustic waveguide of the array.

In some examples, each logical phi-bit of the plurality of logical phi-bits is associated with a different frequency range of the one or more acoustic fields (e.g., such as the 16 different frequency ranges depicted in FIG. 1B). The different frequency ranges can be determined based on the spectral partitioning and an amplitude threshold value (e.g., such as the amplitude threshold value 154 of FIG. 1B). In some cases, spectrally partitioning the one or more acoustic fields comprises determining a Fourier sum of a plurality of linear modes and a plurality of nonlinear modes of the one or more acoustic fields.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A method comprising: driving an array of elastically coupled acoustic waveguides by exciting at least a first acoustic waveguide of the array using a first frequency and a second acoustic waveguide of the array using a second frequency, wherein the first frequency is different from the second frequency; determining a plurality of acoustic fields propagating through the array of elastically coupled acoustic waveguides, wherein each respective acoustic field is generated based on the driving of the array using the first frequency and the second frequency; and determining a plurality of logical phi-bits based on spectrally partitioning the one or more acoustic fields, wherein each logical phi-bit of the plurality of logical phi-bits is associated with at least two independently measurable phases.

Aspect 2. The method of Aspect 1, wherein: determining the plurality of logical phi-bits is based on mixing a plurality of driving frequencies associated with driving the array of elastically coupled acoustic waveguides; and the plurality of driving frequencies includes at least the first frequency and the second frequency.

Aspect 3. The method of any of Aspects 1 to 2, wherein: each logical phi-bit of the plurality of logical phi-bits corresponds to a respective nonlinear mode of a plurality of nonlinear modes with different mixed frequencies.

Aspect 4. The method of Aspect 3, wherein each respective nonlinear mode is associated with a characteristic frequency based on frequency mixing of a plurality of driving frequencies used to drive the array of elastically coupled acoustic waveguides.

Aspect 5. The method of any of Aspects 1 to 4, wherein the at least two independently measurable phases associated with each logical phi-bit comprise: a first phase difference determined between a first phase measurement associated with the first acoustic waveguide and a second phase measurement associated with the second acoustic waveguide; and a second phase difference determined between the first phase measurement and a third phase measurement associated with a third acoustic waveguide of the array.

Aspect 6. The method of any of Aspects 1 to 5, wherein: each logical phi-bit of the plurality of logical phi-bits is associated with a different frequency range of the one or more acoustic fields; and the different frequency ranges are determined based on the spectral partitioning and an amplitude threshold value.

Aspect 7. The method of any of Aspects 1 to 6, wherein spectrally partitioning the one or more acoustic fields comprises determining a Fourier sum of a plurality of linear modes and a plurality of nonlinear modes of the one or more acoustic fields.

Aspect 8. The method of any of Aspects 1 to 7, wherein the array of elastically coupled acoustic waveguides includes at least three acoustic waveguides.

Aspect 9. The method of any of Aspects 1 to 8, wherein the array of elastically coupled acoustic waveguides comprises a planar array of metal rods coupled elastically along a longitudinal length of each respective metal rod.

Aspect 10. The method of any of Aspects 1 to 9, wherein: the array of elastically coupled acoustic waveguides is driven using a plurality of external drivers, each external driver of the plurality of external drivers coupled to an acoustic waveguide included in the array; and the plurality of acoustic signals are determined using a plurality of recording transducers, wherein a quantity of recording transducers is greater than or equal to a quantity of external drivers.

Aspect 11. The method of Aspect 10, wherein: the quantity of external drivers is less than or equal to a quantity of acoustic waveguides included in the array of elastically coupled acoustic waveguides.

Aspect 12. The method of any of Aspects 10 to 11, wherein: the quantity of recording transducers is equal to a quantity of acoustic waveguides included in the array of elastically coupled acoustic waveguides, each recording transducer coupled to a different acoustic waveguide of the array.

Aspect 13. The method of any of Aspects 10 to 12, wherein: the plurality of external drivers are disposed at a first distal end of the array of elastically coupled acoustic waveguides; and the plurality of recording transducers are disposed at a second distal end of the array of elastically coupled acoustic waveguides, the first distal end opposite from the second distal end.

Aspect 14. The method of any of Aspects 1 to 13, wherein: a first external driver of a plurality of external drivers is used to excite the first acoustic waveguide using a waveform generated with the first frequency; and a second external driver of the plurality of external drivers is used to excite the second acoustic waveguide using a waveform generated with the second frequency.

Aspect 15. The method of any of Aspects 1 to 14, further comprising: determining a corresponding signal for each acoustic field of the plurality of acoustic fields based on measurements obtained using one or more non-contact transducers associated with the array of elastically coupled acoustic waveguides.

Aspect 16: An apparatus comprising one or more means for performing operations according to any of Aspects 1 to 15.

Appendix A

Example Physical Platform

In one illustrative example, an experimental realization of the nonlinear acoustic waveguide-transducer-amplifier-signal generator platform (e.g., such as the example platform 100 depicted in the example of FIG. 1A) can be provided to include one or more of the following components. For example, the experimental realization or physical platform can include three aluminum rods that act as waveguides (e.g., McMaster-Carr multipurpose 6061 aluminum rod with certification ½" diameter, 0.609 m length, and density $\rho=2,660$ kg/m$^3$). The lateral gap between the rods can be filled with epoxy (e.g., 50176 KwikWeld Syringe). Two sets of transducers (e.g., V133-RM—Olympus IMS) can be used to drive and to detect the acoustic field at the ends of the rods. Two driving transducers can be utilized, connected to waveform generators (e.g., B&K Precision 4055B) through one or more amplifiers (e.g., PD200 amplifiers, which are a high-bandwidth, low-noise linear amplifier).

The three recording transducers can be connected to a data acquisition system comprising an oscilloscope (e.g., Tektronix oscilloscope MDO3024) to detect signals at the rod end. The input (e.g., driving) and output (e.g., response) signals can collected or otherwise measured using the oscilloscope or data acquisition system. The waveform generators can be connected to a computing device configured to control the experimental realization/physical platform. The oscilloscope(s) or other data acquisition system(s) can additionally be connected to a same or different computing device configured to perform data processing.

Appendix B

Nonlinearly Coupled Array of Elastic Waveguides

Consider an example system including three one-dimensional elastic waveguides coupled elastically along their length. The example system can be stimulated externally at some position x=0 (e.g., along the horizontal x-axis depicted in FIG. 6, which illustrates an example schematic of a parallel array 600 comprising three coupled waveguides 602, 604, 606 labeled as '1,' '2,' and '3' respectively) by piezoelectric transducers provided at each of the two distal ends of the waveguides 602-606 (e.g., a first distal end of each waveguide may be located at the left-most end of each waveguide and a second distal end may be located at the right-most end of each waveguide, or vice versa), wherein the piezoelectric transducers are electrically driven through signal generators and amplifiers.

In the long wavelength limit, the wave equation can take the form:

$$\left[\left(\frac{\partial^2}{\partial t^2}-\beta^2\frac{\partial^2}{\partial x^2}+\mu\frac{\partial}{\partial t}\right)\vec{I}+\alpha^2\vec{M}\right]\vec{U}+\varepsilon\vec{G}(\vec{U})= \qquad (1)$$

$$\vec{F}_1\delta_{x=0}\cos\omega_1 t+\vec{F}_2\delta_{x=0}\cos\omega_2 t$$

where the parameter $\beta$ is proportional to the speed of sound in the waveguides 602-606; x represents a position along the waveguides 602-606; $\mu$ is a damping parameter; $\vec{I}$ is the identity matrix; $\alpha$ stands for the coupling strength of an epoxy material 615 between adjacent pairs of the parallel waveguides 602-606; $\vec{M}$ is the matrix describing the elastic coupling between the three waveguides 602-606; and $\vec{F}_1$ and $\vec{F}_2$ are 3×1 vectors representing the driving forces applied on each waveguide 602, 604, 606 for two different driving angular frequencies, $\omega_1=2\pi f_1$ and $\omega_2=2\pi f_2$.

For purposes of mathematical simplicity and clarity of explanation, in this example of Appendix B, the expression of the driving forces can be reduced to the positive frequencies $$\vec{F}_1 \delta_{x=0} e^{i\omega_1 t} + \vec{F}_2 \delta_{x=0} e^{i\omega_2 t}$$

therefore limit nonlinear effects to the mixing of the positive frequencies.

In the case of a planar array of waveguides (e.g., such as the planar array 600 of the waveguides 602-606), the coupling matrix can take the form:

$$\vec{M} = \begin{pmatrix} 1 & -1 & 0 \\ -1 & 2 & -1 \\ 0 & -1 & 1 \end{pmatrix} \quad (2)$$

The 3×1 vector $\vec{U} = (U_1, U_2, U_3)$ represents the displacement in waveguides 1, 2 and 3 (e.g., waveguides 602, 604, 606 respectively). The term $\varepsilon \vec{G}(\vec{U})$ represents the nonlinearity of the system composed of the waveguides 602-606, transducers, amplifiers and signal generators (e.g., such as those depicted in FIG. 1A and described previously above). $\varepsilon$ is a measure of the strength of the nonlinear term. The physical origin of the nonlinearity (e.g., a mechanical or electrical physical origin), is not critical and/or may be disregarded when the nonlinearity depends on the displacement $\vec{U}$.

In some cases, the nonlinear term $\varepsilon \vec{G}(\vec{U})$ can arise from intrinsic and/or geometric nonlinearity of the elastic system. This nonlinear term may also result from nonlinear feedback between the amplifiers and/or generators (e.g., through the coupled transducers). Notably, in both cases the nonlinear term can be seen to depend on the elastic displacement field and therefore would be able to mix waves with different frequencies.

For the sake of illustration and clarity of explanation, the following discussion considers a simple quadratic nonlinearity which depends on the difference on the displacement between adjacent waveguides:

$$\vec{G}(\vec{U}) = \begin{pmatrix} (U_1 - U_2)^2 \\ -(U_1 - U_2)^2 + (U_2 - U_3)^2 \\ -(U_2 - U_3)^2 \end{pmatrix} \quad (3)$$

In the context of Appendix B, Eq. (1) can be solved within perturbation theory.

Assuming a small $\varepsilon$, the displacement field can be expanded to first order in perturbation:

$$\vec{U} = \vec{U}^{(0)} + \varepsilon \vec{U}^{(1)} \quad (4)$$

Inserting Eq. (4) into Eq. (1) yields to zeroth order in perturbation:

$$\left[\left(\frac{\partial^2}{\partial t^2} - \beta^2 \frac{\partial^2}{\partial x^2} + \mu \frac{\partial}{\partial t}\right)\vec{I} + \alpha^2 \vec{M}\right] \vec{U}^{(0)} = \vec{F}_1 \delta_{x=0} e^{i\omega_1 t} + \vec{F}_2 \delta_{x=0} e^{i\omega_2 t} \quad (5)$$

The terms $\lambda_n$ and $\vec{E}_n$ can now be defined with n=1, 2, 3, the eigen values and eigen vectors of the matrix $\vec{M}$. The term $\vec{E}_n$ represents the spatial eigen modes across the waveguides with components $E_{n,j}$, j=1,2,3. One of the eigen vectors for which $\lambda_1=0$, namely $$\vec{E}_1^T = \frac{1}{\sqrt{3}}(1, 1, 1),$$

does not involve transfer of energy between the waveguides via the coupling. This trivial case can be seen as equivalent to three independent waveguides.

The other two eigen modes of the coupling matrix with eigen values $\lambda_2=1$ and $\lambda_3=3$ can be given as:

$$\vec{E}_2 = \begin{pmatrix} E_{2,1} \\ E_{2,2} \\ E_{2,3} \end{pmatrix} = \frac{1}{\sqrt{2}} \begin{pmatrix} 1 \\ 0 \\ -1 \end{pmatrix}, \vec{E}_3 = \begin{pmatrix} E_{3,1} \\ E_{3,2} \\ E_{3,3} \end{pmatrix} = \frac{1}{\sqrt{6}} \begin{pmatrix} 1 \\ -2 \\ 1 \end{pmatrix}$$

which can accordingly yield:

$$\vec{M} \vec{E}_n = \lambda_n \vec{I} \vec{E}_n \quad (6)$$

Since the term $\vec{E}_n$ forms a complete orthonormal basis, the displacement vector can be represented as:

$$\vec{U}^{(0)} = \sum_n u_n^{(0)} \vec{E}_n \quad (7)$$

Based at least in part on the observation that Eq. (5) is linear, focus can be provided on a single driving frequency, $\vec{F}_l$ with l=1 or 2. Accordingly, solutions can be sought for the equation:

$$\left[\left(\frac{\partial^2}{\partial t^2} - \beta^2 \frac{\partial^2}{\partial x^2} + \mu \frac{\partial}{\partial t}\right)\vec{I} + \alpha^2 \vec{M}\right] \vec{U}_l^{(0)} = \vec{F}_l \delta_{x=0} e^{i\omega_l t} \quad (8)$$

The 3×1 vector $\vec{F}_l$ can also expressed in the $\vec{E}_n$ basis, as:

$$\vec{F}_l = \sum_n F_n^{(l)} \vec{E}_n \quad (9)$$

The $F_n^{(l)}$ terms may therefore be defined as the dot product $\vec{F}_l \cdot \vec{E}_n$ between the two 3×1 vectors. Inserting Eqs (6), (7) and (8) into Eq. (1) leads to a set of three equations of the form:

$$\left(\frac{\partial^2}{\partial t^2} - \beta^2 \frac{\partial^2}{\partial x^2} + \mu \frac{\partial}{\partial t} + \alpha^2 \lambda_n\right) u_{n,l}^{(0)} = F_n^{(l)} \delta_{x=0} e^{i\omega_l t} \quad (10)$$

Subsequently, plane wave solutions can be sought which follow the driver in time:

$$u_{n,l}^{(0)} = \sum_{k_n} A_{n,l}(k_n) e^{ik_n x} e^{i\omega_l t} \quad (11)$$

In Eq. (11) the summation over the wave numbers $k_n$ is discrete, thus implying that the waveguides have the same finite length.

Inserting Eq. (11) into Eq. (10) and evaluating at x=0 yields the driven complex amplitudes:

$$A_{n,l}(k_n) = \frac{F_n^{(l)}}{\omega_{0,n}^2(k_n) - \omega_d^2 + i\mu\omega} \quad (12)$$

where the characteristic frequency can be given as:

$$\omega_{0,n}^2(k_n) = \beta^2 k_n^2 + \alpha^2 \lambda_n \quad (13)$$

The displacement field can therefore be obtained as:

$$\vec{U}_l^{(0)} = \sum_{n=1}^{3} \vec{E}_n \sum_{k_n} A_{n,l}(k_n) e^{ik_n x} e^{i\omega_l t} \quad (14)$$

with the complex resonant amplitudes given by Eq. (12). When driving the system at two different frequencies, the complete displacement field can be given as:

$$\vec{U}^{(0)} = \quad (15)$$

$$\vec{U}_1^{(0)} + \vec{U}_2^{(0)} = \sum_{n=1}^{3} \vec{E}_n \left( \sum_{k_n} A_{n,1}(k_n) e^{ik_n x} e^{i\omega_1 t} + \sum_{k_n'} A_{n,2}(k_n') e^{ik_n' x} e^{i\omega_2 t} \right)$$

Note that in Eq. (16), two independent summation indices are used for the wavenumber, namely $k_n$ and $k'_n$.

To first order in perturbation, the equation of motion takes the form:

$$\left[\left(\frac{\partial^2}{\partial t^2} - \beta^2 \frac{\partial^2}{\partial x^2} + \mu \frac{\partial}{\partial t}\right)\vec{I} + \alpha^2 \vec{M}\right] \vec{U}^{(1)} + \vec{G}(\vec{U}^{(0)}) = 0 \quad (16)$$

In Eq. (16), the zeroth order displacement can be seen to drive the system with mixed frequencies.

Defining $$S_{n,l} = \sum_{k_n} A_{n,l}(k_n) e^{ik_n x},$$

the first component of the nonlinear term can be calculated as:

$$\{(U_1^{(0)} - U_2^{(0)})^2\}_{\omega_1 \omega_2} = \left(\sum_{n=1}^{3} (E_{n,1} - E_{n,2})(S_{n,l=1} e^{i\omega_1 t} + S_{n,l=2} e^{i\omega_2 t})\right)^2 \quad (17)$$

Focusing on the terms which correspond to mixed frequencies only, Eq. (17) can be reduced to:

$$(U_1^{(0)} - U_2^{(0)})^2 = \sum_{n=1}^{3} \sum_{m=1}^{3} g_{n,m}^{1,2} S_{n,l=1} S_{m,l=2} e^{i(\omega_1 + \omega_2)t} \quad (18)$$

where $g_{n,m}^{1,2} = 2(E_{n,1} - E_{n,2})(E_{m,1} - E_{m,2})$.

The contribution of each of the nine {n, m} terms to $\vec{G}(\vec{U}^{(0)})$ in Eq. (18) can be given as:

$$\begin{pmatrix} g_{n,m}^{1,2} \\ -g_{n,m}^{1,2} + g_{n,m}^{2,3} \\ -g_{n,m}^{2,3} \end{pmatrix} \quad (19)$$

Each of these 3×1 vectors can be expended on the complete basis of the $\vec{E}_n$ term in the form:

$$\sum_p \tilde{g}_p^{(n,m)} \vec{E}_p.$$

The nonlinear term can then be expressed as:

$$\vec{G}(\vec{U}^{(0)}) = \sum_p \sum_{n=1}^{3} \sum_{m=1}^{3} \tilde{g}_p^{(n,m)} \vec{E}_p S_{n,l=1} S_{m,l=2} e^{i(\omega_1 + \omega_2)t} \quad (20)$$

Similarly, the first order displacement field for each {n,m} term can be expanded on the same basis:

$$\vec{U}^{(1)}(n, m) = \sum_p u_p^{(1)}(n, m) \vec{E}_p.$$

With the above, the following can be obtained:

$$\vec{U}^{(1)} = \sum_p \sum_{n=1}^{3} \sum_{m=1}^{3} u_p^{(1)}(n, m) \vec{E}_p S_{n,l=1} S_{m,l=2} e^{i(\omega_1 + \omega_2)t} \quad (21)$$

Inserting these expansions into Eq. (16), the equations of motion to first order in perturbation reduce to three equations with p=1, 2, 3:

$$(-i(\omega_1 + \omega_2)^2 + \beta^2 (k_n + k_m)^2 + i\mu(\omega_1 + \omega_2) + \alpha^2 \lambda_p) u_p^{(1)}(n, m) + \tilde{g}_p^{(n,m)} = 0 \quad (22)$$

leading to the resonant amplitude $$u_p^{(1)}(n, m) = \frac{\sim \tilde{g}_p^{(n,m)}}{\left(-(w_1 + w_2)^2 + \beta^2 (k_n + k_m)^2 + i\mu(\omega_1 + \omega_2) + \alpha^2 \lambda_p\right)} \quad (23)$$

Evaluating the complete first order displacement field for a given 1+2 at one end of the waveguide array (say x=0), gives:

$$\vec{U}^{(1)} = \sum_p \sum_{n=1}^3 \sum_{m=1}^3 u_p^{(1)}(n,m) \vec{E}_p \sum_{k_n} \sum_{k_m} A_{n,1}(k_n) A_{m,2}(k_m) e^{i(\omega_1+\omega_2)t} \quad (24)$$

This displacement field can be expressed in the compact form:

$$\vec{U}^{(1)} = \begin{pmatrix} C_1 e^{i\varphi_1} \\ C_2 e^{i\varphi_2} \\ C_3 e^{i\varphi_3} \end{pmatrix} e^{i(\omega_1+\omega_2)t} \quad (25)$$

The complex resonant amplitudes, $u_p^{(1)}(n,m)$, $A_{n,1}(k_n)$ and $A_{m,2}(k_m)$ can be seen to introduce a phase difference between the components of the displacement field $\vec{U}^{(1)}$. Setting one of these phase differences to zero, the other two phase differences form the experimental measurables:

$$\vec{U}^{(1)} = \begin{pmatrix} 1 \\ \hat{C}_2 e^{i\varphi_{12}} \\ \hat{C}_3 e^{i\varphi_{13}} \end{pmatrix} e^{i(\omega_1+\omega_2)t} \quad (26)$$

where $\hat{C}_2$ and $\hat{C}_3$ are normalized to $C_1$ and $\varphi_{12}=\varphi_2-\varphi_1$ and $\varphi_{13}=\varphi_3-\varphi_1$. The argument made here was illustrated for a simple case of quadratic nonlinearity. Note that here, the discussion is limited to the case of positive frequencies. However, the cosine functions in Eq. (1) may also contain complex exponentials with negative terms, namely $e^{-\omega_1 t}$ and $e^{-\omega_1 t}$. Nonlinear mixing of positive and negative driving frequencies will lead to first order displacements in $e^{\pm i(\omega_1-\omega_2)t}$.

Appendix C

Representation of Multi Phi-Bit Systems

In Appendix B, it was shown that the nonlinear displacement field to first order in perturbation measured at one end of the externally driven array of three coupled elastic waveguides can be represented as (e.g., Eq (26) from Appendix B):

$$\vec{U}_{(i)}^{(1)} = \begin{pmatrix} 1 \\ \hat{C}_2 e^{i\varphi_{12}} \\ \hat{C}_3 e^{i\varphi_{13}} \end{pmatrix} e^{i\omega^{(i)} t} \quad (1)$$

where the amplitudes of the field at the end of waveguides 2 and 3, $\hat{C}_2$ and $\hat{C}_3$ are normalized to the amplitude at the end of waveguide 1, $\hat{C}_1$.

Here $\varphi_{12}=\varphi_2-\varphi_1$ and $\varphi_{13}=\varphi_3-\varphi_1$, are the phases measured at the end of waveguides 2 and 3 relative to that of rod 1.

Note that the phase differences $\varphi_{12}$ and $\varphi_{13}$ depend on "i" and should therefore be formulated as $\varphi_{12}^{(i)}$ and $\varphi_{13}^{(i)}$. However, for the sake of simplifying the notation, the superscript (i) can be dropped.

$\omega^{(i)}=(\omega_1+\omega_2)$ is the frequency of a nonlinear mode, i, mixing the two drivers' frequencies $\omega_1$ and $\omega_2$. Other modes result from different combinations of the driving frequencies, but the general form of Eq. (1) is retained. This description can be reduced by dropping direct reference to rod 1 in the representation. In that case, the measured field at the end of the waveguides can be represented by a 2×1 vector:

$$\vec{U}_{(i)} = \begin{pmatrix} \hat{C}_2 e^{i\varphi_{12}} \\ \hat{C}_3 e^{i\varphi_{13}} \end{pmatrix} e^{i\omega^{(i)} t} \quad (2)$$

$\hat{C}_2$ and $\hat{C}_3$ are obtained by normalizing the 2×1 vector. Each nonlinear mode, i, is equivalent to an oscillator with characteristic frequency $\omega^{(i)}$, with normalized phase dependent amplitude characterized by a 2×1 vector. In some embodiments, this can be seen as the representation of one phi-bit.

An equation of motion representing the evolution of oscillations along the positive timeline of this oscillator may take the form:

$$\left[\left(-\frac{d}{dt}+i\omega^{(i)}\right) \bar{I}_{2\times 2} + \vec{\hat{C}}_{2\times 2}^{(i)}\right] \vec{V}_{(i)} = 0 \quad (3)$$

Seeking solutions in the general form:

$$\vec{V}_{(i)} = \begin{pmatrix} V_1^{(i)} \\ V_2^{(i)} \end{pmatrix} e^{i\omega^{(i)} t}$$

one recovers the representation given by Eq. (2) when:

$$\vec{\hat{C}}_{2\times 2}^{(i)} = \begin{pmatrix} -1 & X \\ -X^{-1} & 1 \end{pmatrix}$$

with $X=\hat{c}_2 e^{i\varphi_{12}}/\hat{c}_3 e^{i\varphi_{13}}$. The eigen values of the matrix $\vec{\hat{C}}_{2\times 2}^{(i)}$ are equal to zero; its Eigen vectors are the 2×1 vectors of Eq. (2). The eigen frequency $\omega^{(i)}$ is equal to the characteristic frequency of the oscillator, $\omega^{(i)}$. The product of functions $$e^{i\omega^{(i)} t}$$

and the eigen vectors of $\vec{\hat{C}}_{2\times 2}^{(i)}$ form a complete basis for the states of the oscillator, i. These basis vectors define the Hilbert space, $h_{(i)}$, of a single oscillator i.

Equations of motion can now be constructed for a multipartite system composed of N independent phi-bits:

$$\left[\left(-\frac{d}{dt}+i\omega^{(1)}+\ldots+i\omega^{(N)}\right) \bar{I}_{2^N \times 2^N} + \vec{\hat{C}}_{2\times 2}^{(1)} \otimes \ldots \otimes \vec{\hat{C}}_{2\times 2}^{(1)}\right] \vec{W} = 0 \quad (4)$$

The solutions of these equations are tensor products of single phi-bit states, namely:

$$\vec{W} = \vec{U}_{(1)} \oplus \ldots \oplus \vec{U}_{(N)}.$$

The tensor product of the basis vectors of single phi-bit forms a complete basis for the states of the non-interacting multipartite system. This basis defines a $2^N$ dimensional Hilbert space, H, which is the tensor product of the N Hilbert spaces of the individual oscillators:

$$H = h_{(1)} \otimes \ldots \otimes h_{(N)}.$$

In the case of interacting phi-bits, the tensor product:

$$\vec{C}^{(1)}_{2\times 2} \otimes \ldots \otimes \vec{C}^{(1)}_{2\times 2}$$

in Eq. (4) may be replaced by a general matrix $\vec{C}_{2^N \times 2^N}$. The Hilbert space spanned by the states of the interacting system is the same as that of the non-interacting system. A state of the interacting system may then be written as a linear combination (e.g., with complex coefficients) of the basis vectors of H.

New representations of the N phi-bit system can then be defined by applying a unitary transformation to the basis of H. In the context of the present disclosure, a transformation is considered such that the complex coefficients of a state of the multipartite system take the form:

$$1 + e^{i \sum_{j=1}^{N} \varphi_{1_{q_j}}^{(i)}} \text{ where } q_{j=2,3}.$$

Here, we the superscript (j) is brought back to differentiate the phi-bits. However, it is noted that this is but one of the many possible representations of the N phi-bit system which can be utilized without departing from the scope of the present disclosure.

Appendix D

Examples of Separable and Non-Separable States in a N=2 Phi-Bit System

In a bipartite system with two logical phi-bits (e.g., phi-bits 9 and 15), for the particular tuning parameter $\Delta v = 1.2$ kHz, the experimentally measured elastic state can be represented by the vector:

$$|\psi\rangle = \begin{pmatrix} 0.0878 + 0.2510i \\ 0.0945 + 0.2592i \\ 0.5348 - 0.3803i \\ 0.5248 - 0.3836i \end{pmatrix},$$

and the corresponding density matrix $\rho = |\psi\rangle \langle \psi|$. The corresponding reduced density matrix can be calculated as:

$$\rho_9 = \begin{pmatrix} 0.5013 & 0.4999 - 0.0065i \\ 0.4999 + 0.0065i & 0.4987 \end{pmatrix},$$

$$\rho_{15} = \begin{pmatrix} 0.1468 & -0.0983 - 0.3399i \\ -0.0983 + 0.3399i & 0.8532 \end{pmatrix}$$

These reduced density matrices give values of the entropy of entanglement which are almost zero, thereby indicating that this state is separable. Indeed, the state vector can be written as:

$$|\psi\rangle = \begin{pmatrix} 0.0878 + 0.2510i \\ 0.0945 + 0.2592i \\ 0.5348 - 0.3803i \\ 0.5248 - 0.3836i \end{pmatrix} \approx \begin{pmatrix} 0.1235 + 0.3824i \\ 0.8217 - 0.5549i \end{pmatrix} \otimes \begin{pmatrix} 0.6616 - 0.0160i \\ 0.6861 - 0.0256i \end{pmatrix} \approx$$

$$[(0.1235 + 0.3824i)|0\rangle_9 + (0.8217 - 0.5549i)|1\rangle_9] \otimes$$
$$[(0.6616 - 0.0160i)|0\rangle_{15} + (0.6861 - 0.0256i)|1\rangle_{15}]$$

For a different detuning parameter $\Delta v = 3.2$ kHz, the elastic state can be represented by the state vector:

$$|\psi\rangle = \begin{pmatrix} 0.0201 - 0.1363i \\ 0.2932 + 0.4366i \\ 0.6779 - 0.4242i \\ 0.0689 - 0.2455i \end{pmatrix},$$

and the corresponding reduced density matrix:

$$\rho_9 = \begin{pmatrix} 0.6584 & 0.0973 - 0.0884i \\ 0.0973 + 0.0884i & 0.3416 \end{pmatrix},$$

$$\rho_{15} = \begin{pmatrix} 0.2955 & -0.0155 - 0.0182i \\ -0.0155 + 0.0182i & 0.7045 \end{pmatrix}.$$

The above results in entropy value of 0.874 log 2, which indicates that the state corresponding to a detuning frequency $\Delta v = 3.2$ kHz is nonseparable. The state vector cannot be written as a tensor product of two vectors.

What is claimed is:

1. A method comprising:
   driving an array of elastically coupled acoustic waveguides by exciting at least a first acoustic waveguide of the array using a first frequency and a second acoustic waveguide of the array using a second frequency, wherein the first frequency is different from the second frequency;
   determining a plurality of acoustic fields propagating through the array of elastically coupled acoustic waveguides, wherein each respective acoustic field is generated based on the driving of the array using the first frequency and the second frequency; and
   determining a plurality of logical phi-bits based on spectrally partitioning the one or more acoustic fields, wherein each logical phi-bit of the plurality of logical phi-bits is associated with at least two independently measurable phases.

2. The method of claim 1, wherein:
   determining the plurality of logical phi-bits is based on mixing a plurality of driving frequencies associated with driving the array of elastically coupled acoustic waveguides; and
   the plurality of driving frequencies includes at least the first frequency and the second frequency.

3. The method of claim 1, wherein:
   each logical phi-bit of the plurality of logical phi-bits corresponds to a respective nonlinear mode of a plurality of nonlinear modes with different mixed frequencies.

4. The method of claim 3, wherein each respective nonlinear mode is associated with a characteristic frequency based on frequency mixing of a plurality of driving frequencies used to drive the array of elastically coupled acoustic waveguides.

5. The method of claim 1, wherein the at least two independently measurable phases associated with each logical phi-bit comprise:
a first phase difference determined between a first phase measurement associated with the first acoustic waveguide and a second phase measurement associated with the second acoustic waveguide; and
a second phase difference determined between the first phase measurement and a third phase measurement associated with a third acoustic waveguide of the array.

6. The method of claim 1, wherein:
each logical phi-bit of the plurality of logical phi-bits is associated with a different frequency range of the one or more acoustic fields; and
the different frequency ranges are determined based on the spectral partitioning and an amplitude threshold value.

7. The method of claim 1, wherein spectrally partitioning the one or more acoustic fields comprises determining a Fourier sum of a plurality of linear modes and a plurality of nonlinear modes of the one or more acoustic fields.

8. The method of claim 1, wherein the array of elastically coupled acoustic waveguides includes at least three acoustic waveguides.

9. The method of claim 1, wherein the array of elastically coupled acoustic waveguides comprises a planar array of metal rods coupled elastically along a longitudinal length of each respective metal rod.

10. The method of claim 1, wherein:
the array of elastically coupled acoustic waveguides is driven using a plurality of external drivers, each external driver of the plurality of external drivers coupled to an acoustic waveguide included in the array; and
the plurality of acoustic signals are determined using plurality of recording transducers, wherein a quantity of recording transducers is greater than or equal to a quantity of external drivers.

11. The method of claim 10, wherein:
the quantity of external drivers is less than or equal to a quantity of acoustic waveguides included in the array of elastically coupled acoustic waveguides.

12. The method of claim 10, wherein:
the quantity of recording transducers is equal to a quantity of acoustic waveguides included in the array of elastically coupled acoustic waveguides, each recording transducer coupled to a different acoustic waveguide of the array.

13. The method of claim 10, wherein:
the plurality of external drivers are disposed at a first distal end of the array of elastically coupled acoustic waveguides; and
the plurality of recording transducers are disposed at a second distal end of the array of elastically coupled acoustic waveguides, the first distal end opposite from the second distal end.

14. The method of claim 1, wherein:
a first external driver of a plurality of external drivers is used to excite the first acoustic waveguide using a waveform generated with the first frequency; and
a second external driver of the plurality of external drivers is used to excite the second acoustic waveguide using a waveform generated with the second frequency.

15. The method of claim 1, further comprising:
determining a corresponding signal for each acoustic field of the plurality of acoustic fields based on measurements obtained using one or more non-contact transducers associated with the array of elastically coupled acoustic waveguides.

* * * * *